(12) United States Patent
Tsujimura et al.

(10) Patent No.: US 12,061,251 B2
(45) Date of Patent: Aug. 13, 2024

(54) RADAR DEVICE, METHOD, AND RADAR SYSTEM

(71) Applicant: KABUSHIKI KAISHA TOSHIBA, Tokyo (JP)

(72) Inventors: Kazuhiro Tsujimura, Kawasaki Kanagawa (JP); Hiroki Mori, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 364 days.

(21) Appl. No.: 17/691,312

(22) Filed: Mar. 10, 2022

(65) Prior Publication Data

US 2023/0079273 A1 Mar. 16, 2023

(30) Foreign Application Priority Data

Sep. 15, 2021 (JP) .................................. 2021-150499

(51) Int. Cl.
*G01S 13/34* (2006.01)
(52) U.S. Cl.
CPC .................................. *G01S 13/34* (2013.01)
(58) Field of Classification Search
CPC ...................................................... G01S 13/34
USPC ........................................................ 342/372
See application file for complete search history.

(56) References Cited

U.S. PATENT DOCUMENTS

| 2020/0103515 A1 | 4/2020 | Kishigami et al. |
| 2021/0159231 A1* | 5/2021 | Lee ................ H10B 12/056 |
| 2021/0278519 A1* | 9/2021 | Mori ................. G01S 13/42 |

FOREIGN PATENT DOCUMENTS

| JP | 6632169 B2 * | 1/2020 | ....... G02F 1/134336 |
| JP | 2020056592 A | 4/2020 | |
| WO | 2020189116 A1 | 9/2020 | |
| WO | WO-2020189457 A1 * | 9/2020 | ........... G01S 13/428 |

OTHER PUBLICATIONS

Gonzalez-Valdes, et al., "Millimeter Wave Imaging Architecture for On-The-Move Whole Body Imaging", IEEE Transactions on Antennas and Propagation (vol. 64, No. 6), 2016, pp. 2328-2338.
Ma, et al., "DOA Estimation of Quasi-Stationary Signals With Less Sensors Than Sources and Unknown Spatial Noise Covariance: A Khatri-Rao Subspace Approach", IEEE Transactions on Signal Processing (vol. 58, No. 4), 2010, pp. 2168-2180.
Moffet, "Minimum-Redundancy Linear Arrays", IEEE Transactions on Antennas and Propagation (vol. 16, No. 2), 1968, pp. 172-175.

* cited by examiner

*Primary Examiner* — Harry K Liu
(74) *Attorney, Agent, or Firm* — Holtz, Holtz & Volek PC

(57) ABSTRACT

According to one embodiment, a radar device includes a first and second radar units. The first radar unit includes a first substrate, and first transmit and receive array antennas. The second radar unit includes a second substrate, and second transmit and receive array antennas. A shape of the first substrate corresponds to a shape of the second substrate. A relative position of the first transmit or receive array antenna in the first substrate corresponds to a relative position of the second transmit or receive array antenna in the second substrate.

11 Claims, 24 Drawing Sheets

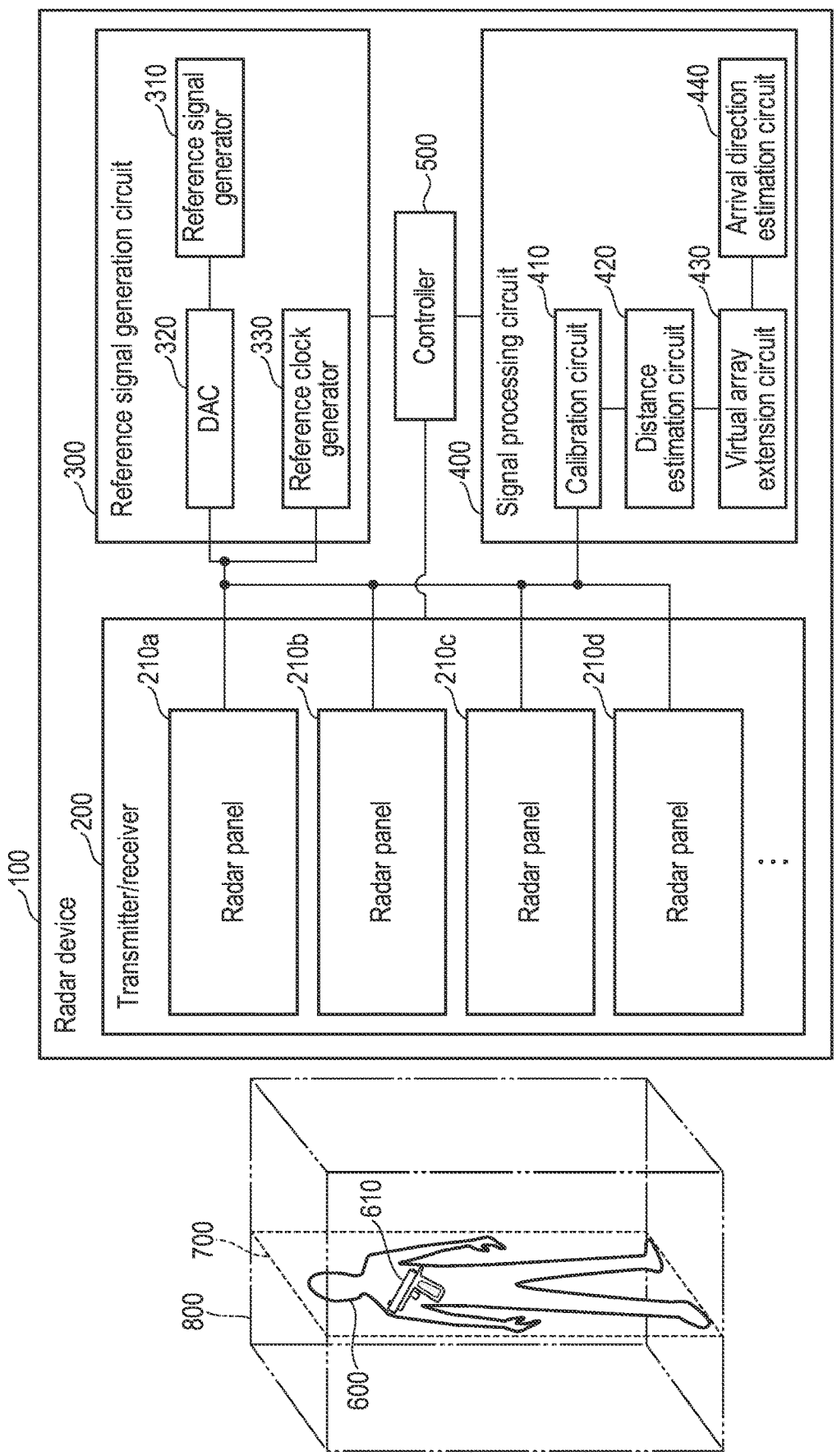
F I G. 1

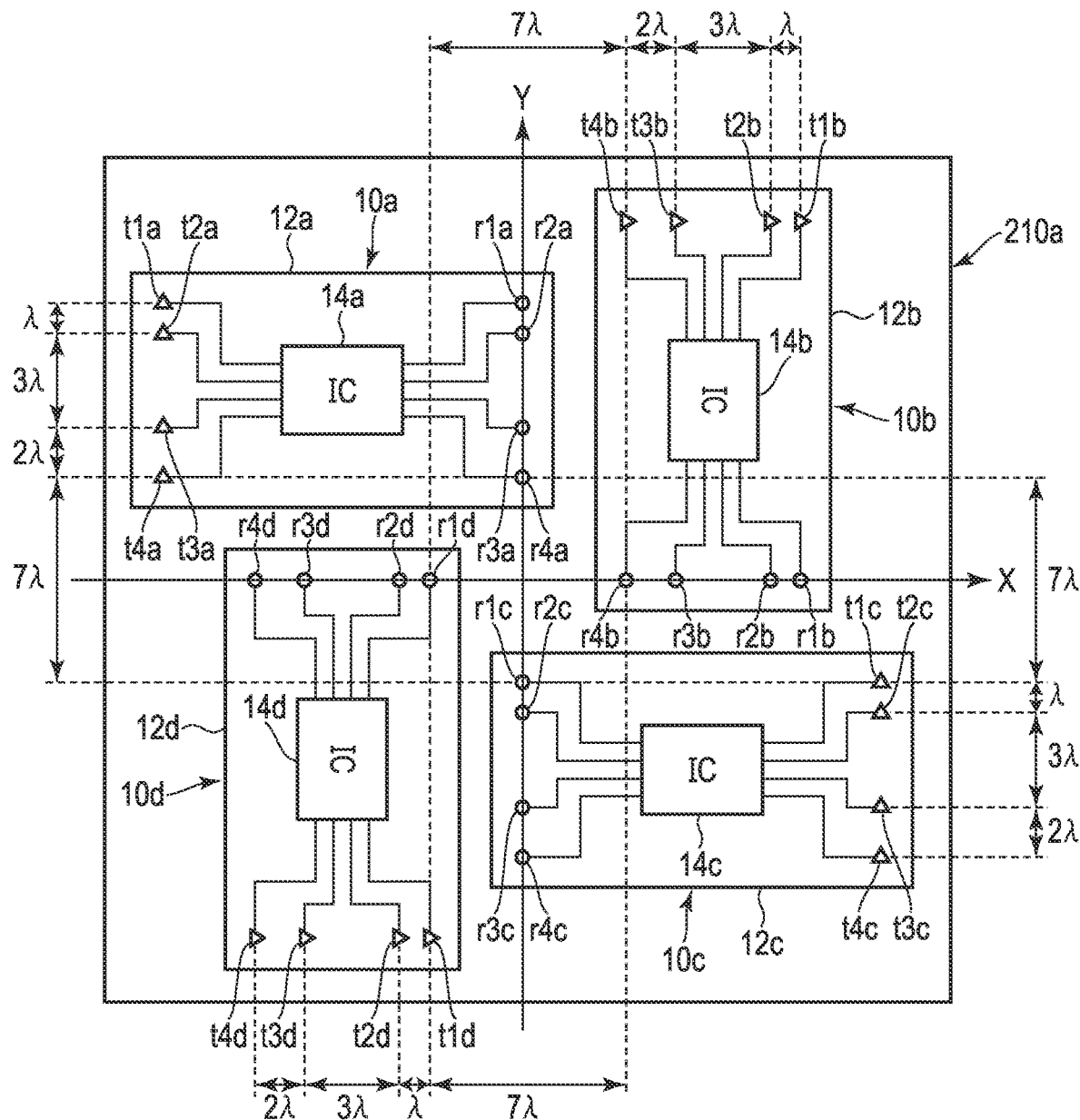
F I G. 2

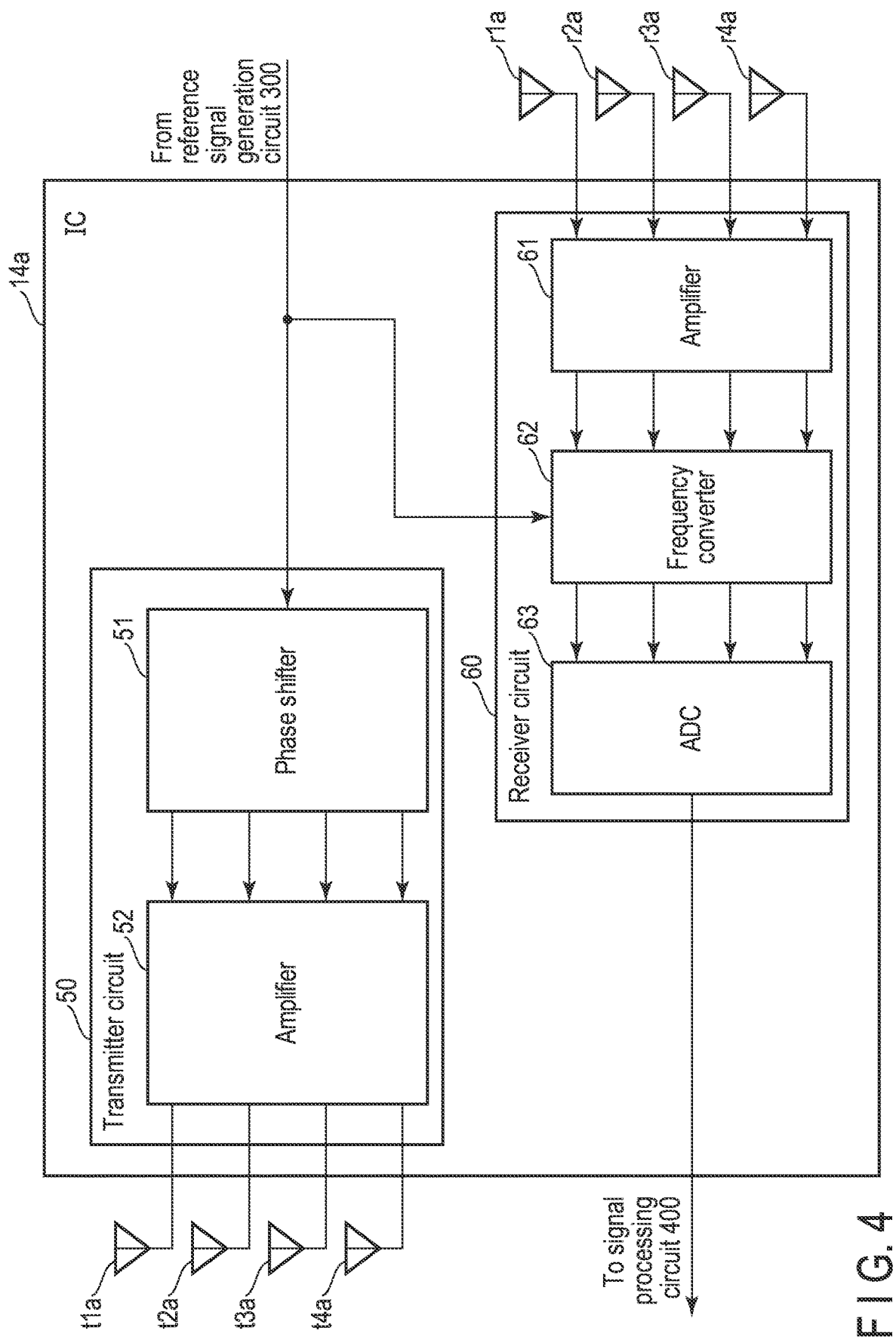
F I G. 4

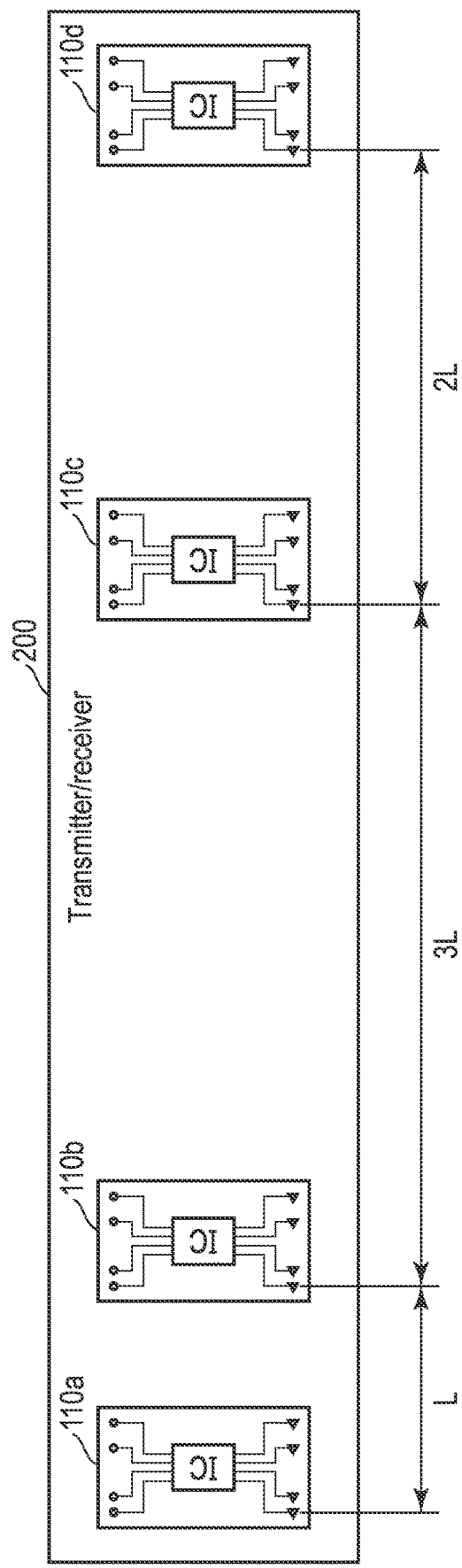
F I G. 24

RADAR DEVICE, METHOD, AND RADAR SYSTEM

CROSS-REFERENCE TO RELATED APPLICATIONS

This application is based upon and claims the benefit of priority from Japanese Patent Application No. 2021-150499, filed Sep. 15, 2021, the entire contents of which are incorporated herein by reference.

FIELD

Embodiments described herein relate generally to a radar device, transmission and reception method, and radar system.

BACKGROUND

A radar devices for inspecting whether or not a person to be inspected (hereinafter referred to as a target person) holds a dangerous object has been proposed. The radar device transmits electromagnetic wave to the target person and receives reflected waves from the target person. The radar device can determine whether or not the target person holds a dangerous object, based on an image of the radar device. The radar device is required to have high angular resolution to perform high accuracy inspection. To increase the angular resolution, an aperture length of an antenna needs to be increased. If an array antenna including a large number of antennas is used, an antenna having a large aperture length can be realized. However, designing a complicated array antenna having a large aperture length is not easy, and the implementation costs are high.

BRIEF DESCRIPTION OF THE DRAWINGS

FIG. 1 is a block diagram illustrating an example of a functional configuration of a radar device according to the embodiment.

FIG. 2 is a diagram illustrating an example of a configuration of a radar panel according to the embodiment.

FIG. 4 is a diagram illustrating an example of an integrated circuit according to the embodiment.

FIG. 24 is a diagram illustrating still another example of a radar panel according to the embodiment.

DETAILED DESCRIPTION

Figure 3A:
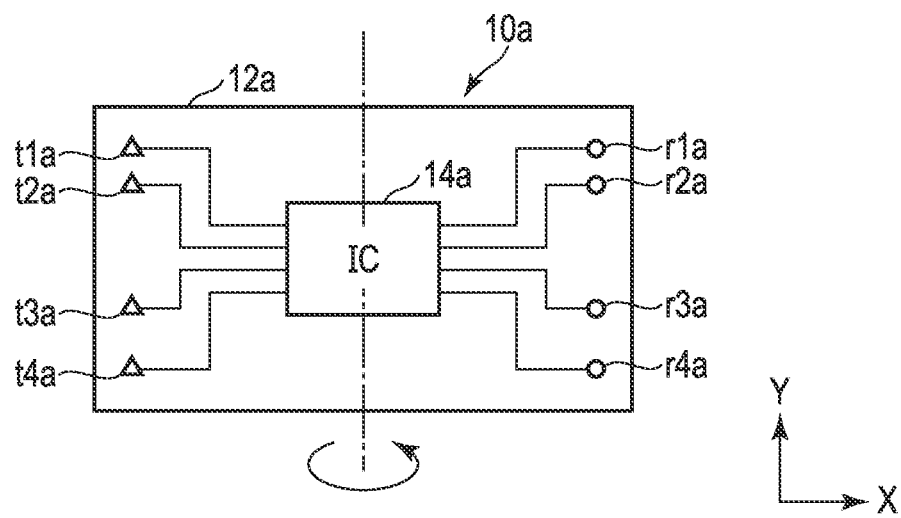
FIG. 3A and FIG. 3B are diagrams illustrating an example of relationship between radar units according to the embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a radar device comprises a first radar unit and a second radar unit. The first radar unit comprises a first substrate, a first transmit array antenna on the first substrate, a first receive array antenna on the first substrate, and a first integrated circuit on the first substrate, configured to control transmission and reception of the first transmit array antenna and the first receive array antenna. The second radar unit comprises a second substrate, a second transmit array antenna on the second substrate, a second receive array antenna on the second substrate, and a second integrated circuit on the second substrate, configured to control transmission and reception of the second transmit array antenna and the second receive array antenna. A shape of the first substrate corresponds to a shape of the second substrate. A relative position of the first transmit array antenna in the first substrate corresponds to a relative position of the second transmit array antenna in the second substrate, or a relative position of an array antenna in the first substrate, the array antenna being in line symmetry with the first transmit array antenna with respect to a straight line which passes through a center of the first substrate and which is parallel to a side of the first substrate, corresponds to a relative position of the second transmit array antenna in the second substrate. A relative position of the first receive array antenna in the first substrate corresponds to a relative position of the second receive array antenna in the second substrate, or a relative position of an array antenna in the first substrate, the array antenna being in line symmetry with the first receive array antenna with respect to a straight line which passes through a center of the first substrate and which is parallel to a side of the first substrate, corresponds to a relative position of the second receive array antenna in the second substrate. The first receive array antenna and the second receive array antenna are configured the receive a reflected wave of an electromagnetic wave transmitted from the first transmit array antenna. The first receive array antenna and the second receive array antenna are configured to receive a reflected wave of an electromagnetic wave transmitted from the second transmit array antenna.

The radar device is installed in, for example, facilities such as airports, train stations, shopping malls, concert halls, and exhibition halls, and is used for security inspections to determine whether or not a target person (user of the facility) holds a dangerous object. For example, the target person is scanned by sequentially transmitting electromagnetic wave to each point of the target person and sequentially receiving the electromagnetic wave reflected at each point of the target person. An image including the target person is generated based on the received signals obtained by the scanning. A manager of the facility can determine whether or not the target person holds a dangerous object or a dangerous object is hidden in the target person's belongings, or the like by confirming this image. Alternatively, the radar device or an external device may analyze an amplitude of the received signal to warn of the level of possibility that the target person holds a dangerous object.

In a security inspection, high angular resolution is required to detect a plurality of adjacent dangerous objects in pockets of clothes. The angular resolution is determined based on the aperture length of the array antenna. The aperture length is increased and the angular resolution is improved if a Multi-input and Multi-output (MIMO) radar is used. However, since the MIMO radar includes a large number of antennas, its design is complicated, which results in high implementation costs. According to embodiments, an array antenna includes a small number of antennas. Furthermore, a design that facilitates wiring is adopted.

FIG. 1 is a block diagram illustrating an example of a functional configuration of a radar device according to the embodiment. A radar device 100 includes a transmitter/receiver 200, reference signal generation circuit 300, signal processing circuit 400, and controller 500.

The reference signal generation circuit 300 includes a reference signal generator 310, Digital to Analog Converter (DAC) 320, and reference clock generator 330.

Various radar systems can be adopted as the radar type, and Frequency Modulated Continuous Wave (FMCW) system is assumed to be adopted in this case. According to the FMCW radar, an electromagnetic wave is transmitted to a target person, a reflected wave from the target person is received, and a distance to the target person can be measured from a frequency difference between a transmitted signal and a received signal. The reference signal generator 310 generates a digital signal indicating an FMCW signal (hereinafter referred to as a chirp signal) whose frequency increases linearly with elapse of time. The DAC 320 converts the digital signal generated by the reference signal generator 301 into an analog signal and generates a chirp signal of the analog signal.

The reference clock generator 330 generates a reference clock.

The chirp signal and the reference clock generated by the reference signal generation circuit 300 are output to the transmitter/receiver 200. The connection between the reference signal generation circuit 300 and the transmitter/receiver 200 may be made by wired connection using a signal line or wireless connection.

The transmitter/receiver 200 includes at least one (four, in this case) radar panels 210a, 210b, 210c, and 210d. The number of the radar panels in the transmitter/receiver 200 is not limited to a plural number, but the transmitter/receiver 200 may include a single radar panel. The chirp signal and the reference clock are supplied to each of the radar panels 210a to 210d. Each of the radar panels 210a to 210d transmits an electromagnetic wave corresponding to the chirp signal to the target person and receives a reflected wave from the target person. As the electromagnetic wave used in the embodiment, an electromagnetic wave with a wavelength of from 1 millimeter to 30 millimeter may be utilized. An electromagnetic wave with a wavelength of 1 to 10 millimeters is referred to as a millimeter wave. An electromagnetic wave with a wavelength of 10 to 100 millimeters is referred to as a microwave. Furthermore, an electromagnetic wave with a wavelength of 100 micrometers to 1 millimeter, which is referred to as a millimeter, may be used. Details of the radar panels 210a to 210d will be described with reference to FIG. 2 to FIG. 4.

Each of the radar panels 210a to 210d converts the received signal of the reflected wave into an intermediate frequency signal (IF signal). The IF signal obtained by each of the radar panels 210a to 210d is output to the signal processing circuit 400. The connection between the radar panels 210a to 210d and the signal processing circuit 400 may be made by wired connection using a signal line or wireless connection.

The signal processing circuit 400 includes a calibration circuit 410, distance estimation circuit 420, virtual array extension circuit 430, and arrival direction estimation circuit 440. The signal processing circuit 400 performs signal processing of the IF signals of all the radar panels 210a to 210d.

The signal processing circuit 400 can obtain an image of a target person 600 in a plane 700 parallel to the radar panels 210a to 210d, which is a plane in an inspection space 800, i.e., a three-dimensional space located in a transmission direction of the electromagnetic wave from the radar panels 210a to 210d. When the image is displayed on a display device and an inspection person observes this image, the inspection person can detect the target person 600 holding a dangerous object 610 (for example, a gun).

The radar device 100 may constantly transmit an electromagnetic wave to the inspection space 800 to perform the inspection at all times. Alternatively, the radar device 100 may include a camera that captures an image of the inspection space 800, detect the target person 600 from the captured image, and, when recognizing the target person 600, transmit an electromagnetic wave only to the target person 600 to perform the inspection. The controller 500 controls the operation of the radar device 100.

Details of the signal processing circuit 400 will be described later with reference to FIG. 5 to FIG. 13.

Next, details of the radar panels 210a to 210d in the transmitter/receiver 200 will be described with reference to FIG. 2 to FIG. 4. Since the radar panels 210a to 210d have the same structure, only the radar panel 210a will be described below. Since the descriptions of the other radar panels 210b, 210c, and 210d are the same, they will be omitted.

FIG. 2 is a diagram illustrating an example of the configuration of the radar panel 210a. A plurality of (four, in this case) radar units 10a, 10b, 10c, and 10d are arranged on the flat radar panel 210a. The radar units 10a to 10d respectively include substrates 12a, 12b, 12c, and 12d, transmit array antennas that transmit an electromagnetic wave to the target person, receive array antennas that receive a reflected wave from the target person, and integrated circuits (ICs) that controls transmit and received electromagnetic waves. The transmit array antenna, receive array antenna, and integrated circuit (IC) are arranged on each of substrates 12a to 12d.

The substrates 12a to 12d have the same shape, for example, a rectangular shape. The substrates 12a and 12c have their longer sides arranged along an X direction of an X-Y-coordinate system having the center of the radar panel 210a as the origin. The substrates 12b and 12d have their longer sides arranged along a Y direction of the X-Y-coordinate system. In other words, the radar units 10a to 10d are arranged in a windmill shape.

Since the transmit antenna and the receive antenna are interchangeable, the transmit array antenna may be read as the receive array antenna, and the receive array antenna may be read as the transmit array antenna in the following descriptions. Similarly, the transmit antenna may be read as the receive antenna, and the receive antenna may be read as the transmit antenna.

More specifically, the radar unit 10a includes the transmit array antenna, receive array antenna, and integrated circuit 14a. The transmit array antenna is arranged in a first shorter side of two shorter sides of the substrate 12a. The receive array antenna is arranged in a second shorter side of the two shorter sides of the substrate 12a. The integrated circuit 14a is arranged in a central part of the substrate 12a.

The transmit array antenna includes a plurality of (four, in this case) transmit antennas t1a, t2a, t3a, and t4a. The transmit antennas t1a to t4a are arranged in a straight line along the Y-axis. A Y-coordinate of each of the transmit antenna t1a to t4a is a positive value. An absolute value of the Y-coordinate of the transmit antenna t1a is the largest, and an absolute value of the Y-coordinate of the transmit antenna t4a is the smallest.

The transmit antennas t1a to t4a may be arranged at non-uniform intervals as illustrated in FIG. 2 or may be arranged at a uniform interval. In the example of FIG. 2, the interval between the transmit antennas t1a and t2a is λ. The interval between the transmit antennas t2a and t3a is 3λ. The interval between the transmit antennas t3a and t4a is 2λ. λ refers to a wavelength within a predetermined tolerance range centered on the wavelength with the highest intensity among the wavelengths included in the electromagnetic wave transmitted by the radar panel 10a. The tolerance range includes ±25 percent of the wavelength with the highest intensity. The tolerance range may be required to be ±10 percent of the wavelength with the highest intensity. λ/2 is also referred to as a reference antenna interval.

A non-uniform array antenna with the antenna intervals illustrated in FIG. 2 are referred to as a Minimum Redundancy Array (MRA) antenna. The MRA is a type of non-uniform array antenna. The MRA is an array antenna in which a combination of antennas with the same interval is minimized and the redundancy of the antenna interval is minimized. The MRA provides a virtual array antenna with antennas arranged at a uniform interval. Since the MRA can equivalently implement the amplitude distribution by the array density of the antennas, the MRA can achieve low side lobes even in a case where the amplitude distribution of antennas is constant. In addition, in the MRA, since grating lobes hardly occur, the antenna interval can be widened and the number of antennas can be reduced.

The receive array antenna includes a plurality of (four, in this case) receive antennas r1a, r2a, r3a, and r4a. The number of transmit antennas and the number of receive antennas may be the same as illustrated in FIG. 2 or may be different from each other. The receive antennas r1a to r4a are arranged in a straight line along the Y-axis. For convenience of description, the receive antennas r1a to r4a are assumed to be arranged on the Y-axis. The substrate 12a is arranged such that its most part is located in the second quadrant of the X-Y-coordinate system of the radar panel 210a. The Y-coordinate of each of the receive antennas r1a to r4a is a positive value. The absolute value of the Y-coordinate of the receive antenna r1a 's the largest, and the absolute value of the Y-coordinate of the receive antenna r4a is the smallest.

The receive antennas r1a to r4a may be arranged at non-uniform intervals as illustrated in FIG. 2 or may be arranged at a uniform interval. In the example of FIG. 2, the interval between the receive antennas r1a and r2a is λ. The interval between the receive antennas r2a and r3a is 3λ. The interval between the receive antennas r3a and r4a is 2λ.

When the receive antennas r1a to r4a are arranged at non-uniform intervals, each antenna interval may be the same as the antenna interval of the transmit antennas t1a to t4a as illustrated in FIG. 2 or may be different. When the receive antennas r1a to r4a are arranged at a uniform interval, each antenna interval may be the same as or different from the antenna interval of the transmit antennas t1a to t4a. The Y-coordinate of each of the receive antennas r1a to r4a may be the same as the Y-coordinate of each of the transmit antennas t1a to t4a as illustrated in FIG. 2 or may be shifted.

The integrated circuit 14a and the transmit antennas t1a to t4a are connected by lines, for example, strip lines. The integrated circuit 14a and the receive antennas r1a to r4a are connected by the lines.

The radar unit 10b includes the transmit array antenna, receive array antenna, and integrated circuit 14b. The transmit array antenna is arranged on a first shorter side of two shorter sides of the substrate 12b. The receive array antenna is arranged on a second shorter side of the two shorter sides of the substrate 12b. The integrated circuit 14b is arranged in a central part of the substrate 12b.

The transmit array antenna includes a plurality of (four, in this case) transmit antennas t1b, t2b t3b, and t4b. The transmit antennas t1b to t4b are arranged in a straight line along the X-axis. An X-coordinate of each of the transmit antenna t1b to t4b is a positive value. An absolute value of the X-coordinate of the transmit antenna t1b is the largest, and the absolute value of the X-coordinate of the transmit antenna t4b is the smallest.

The transmit antennas t1b to t4b may be arranged at non-uniform intervals as illustrated in FIG. 2 or may be arranged at a uniform interval. In the example of FIG. 2, the interval between the transmit antennas t1b and t2b is X. The interval between the transmit antennas t2b and t3b is 3λ. The interval between the transmit antennas t3b and t4b is 2λ.

The receive array antenna includes a plurality of (four, in this case) receive antennas r1b, r2b r3b, and r4b. The number of transmit antennas and the number of receive antennas may be the same as illustrated in FIG. 2 or may be different from each other. The receive antennas r1b to r4b are arranged in a straight line along the X-axis. For convenience of description, the receive antennas r1b to r4b are assumed to be arranged on the X-axis. The substrate 12b is arranged such that its most part is located in the first quadrant of the X-Y-coordinate system of the radar panel 210a. The X-coordinate of each of the receive antennas r1b to r4b is a positive value. The absolute value of the X-coordinate of the receive antenna r1b is the largest, and the absolute value of the X-coordinate of the receive antenna r4b is the smallest.

The receive antennas r1b to r4b may be arranged at non-uniform intervals as illustrated in FIG. 2 or may be arranged at a uniform interval. In the example of FIG. 2, the interval between the receive antennas r1b and r2b is λ. The interval between the receive antennas r2b and r3b is 3λ. The interval between the receive antennas r3b and r4b is 2λ.

When the receive antennas r1b to r4b are arranged at non-uniform intervals, each antenna interval may be the same as the antenna interval of the transmit antennas t1b to t4b as illustrated in FIG. 2 or may be different. When the receive antennas r1b to r4b are arranged at a uniform interval, each antenna interval may be the same as the antenna interval of the transmit antennas t1b to t4b or may be different. The X-coordinate of each of the receive antennas r1b to r4b may be the same as the X-coordinate of each of the receive antennas t1b to t4b as illustrated in FIG. 2 or may be shifted.

The integrated circuit 14b and the transmit antennas t1b to t4b are connected by the lines. The integrated circuit 14b and the receive antennas r1b to r4b are connected by the lines.

The radar unit 10c includes the transmit array antenna, receive array antenna, and integrated circuit. The transmit array antenna is arranged on a first shorter side of two shorter sides of the substrate 12c. The receive array antenna is arranged on a second shorter side of the two shorter sides of the substrate 12c. The integrated circuit 14c is arranged in a central part of the substrate 12c.

The transmit array antenna includes a plurality of (four, in this case) transmit antennas t1c, t2c t3c, and t4c. The transmit antennas t1c to t4c are arranged in a straight line along the Y-axis. The Y-coordinate of each of the transmit antennas t1c to t4c is a negative value. The absolute value of the Y-coordinate of the transmit antenna t1c is the smallest, and the absolute value of the Y-coordinate of the transmit antenna t4c is the largest.

The transmit antennas t1c to t4c may be arranged at non-uniform intervals as illustrated in FIG. 2 or may be arranged at a uniform interval. In the example of FIG. 2, the interval between the transmit antennas t1c and t2c is λ. The interval between the transmit antennas t2c and t3c is 3λ. The interval between the transmit antennas t3c and t4c is 2λ.

The receive array antennas includes a plurality of (four, in this case) receive antennas r1c, r2c, r3c, and r4c. The number of transmit antennas and the number of receive antennas may be the same as illustrated in FIG. 2 or may be different from each other. The receive antennas r1c to r4c are arranged in a straight line along the Y-axis. For convenience of description, the receive antennas r1c to r4c are assumed to be arranged on the Y-axis. The substrate 12c is arranged such that its most part is located in the fourth quadrant of the X-Y-coordinate system of the radar panel 210a. The Y-coordinate of each of the receive antennas r1c to r4c is a negative value. The absolute value of the Y-coordinate of the receive antenna r1c is the smallest, and the absolute value of the Y-coordinate of the receive antenna r4c is the largest.

The receive antennas r1c to r4c may be arranged at non-uniform intervals as illustrated in FIG. 2 or may be arranged at a uniform interval. In the example of FIG. 2, the interval between the receive antennas r1c and r2c is λ. The interval between the receive antennas r2c and r3c is 3λ. The interval between the receive antennas r3c and r4c is 2λ.

When the receive antennas r1c to r4c are arranged at non-uniform intervals, each antenna interval may be the same as the antenna interval of the transmit antennas t1c to t4c as illustrated in FIG. 2 or may be different. When the receive antennas r1c to r4c are arranged at a uniform interval, each antenna interval may be the same as the antenna interval of the transmit antennas t1c to t4c or may be different. The Y-coordinate of each of the receive antennas r1c to r4c may be the same as the Y-coordinate of each of the transmit antennas t1c to t4c as illustrated in FIG. 2 or may be disarranged.

The integrated circuit 14c and the transmit antennas t1c to t4c are connected by the lines. The integrated circuit 14c and the receive antennas r1c to r4c are connected by the lines.

The radar unit 10d includes the transmit array antenna, receive array antenna, and integrated circuit 14d. The transmit array antenna is arranged on a first shorter side of two shorter sides of the substrate 12d. The receive array antenna is arranged on a second shorter side of the two shorter sides of the substrate 12d. The integrated circuit 14d is arranged in a central part of the substrate 12d.

The transmit array antenna includes a plurality of (four, in this case) transmit antennas t1d, t2d, t3d, and t4d. The transmit antennas t1d to t4d are arranged in a straight line along the X-axis. The X-coordinate of each of the transmit antennas t1d to t4d is a negative value. The absolute value of the X-coordinate of the transmit antenna t1d is the smallest, and the absolute value of the X-coordinate of the transmit antenna t4d is the largest.

The transmit antennas t1d to t4d may be arranged at non-uniform intervals as illustrated in FIG. 2 or may be arranged at a uniform interval. In the example of FIG. 2, the interval between the transmit antennas t1d and t2d is λ. The interval between the transmit antennas t2d and t3d is 3λ. The interval between the transmit antennas t3d and t4d is 2λ.

The receive array antennas includes a plurality of (four, in this case) of receive antennas r1d, r2d, r3d, and r4d. The number of transmit antennas and the number of receive antennas may be the same as illustrated in FIG. 2 or may be different from each other. The receive antennas r1d to r4d are arranged in a straight line along the X-axis. For convenience of description, the receive antennas r1d to r4d are assumed to be arranged on the X-axis. The substrate 12d is arranged such that its most part is located in the third quadrant of the X-Y-coordinate system of the radar panel 210a. The X-coordinate of each of the receive antennas r1d to r4d is a negative value. The absolute value of the X-coordinate of the receive antenna r1d is the smallest, and the absolute value of the X-coordinate of the receive antenna r4d is the largest.

The receive antennas r1d to r4d may be arranged at non-uniform intervals as illustrated in FIG. 2 or may be arranged at a uniform interval. In the example of FIG. 2, the interval between the receive antennas r1d and r2d is λ. The interval between the receive antennas r2d and r3d is 3λ. The interval between the receive antennas r3d and r4d is 2λ.

When the receive antennas r1d to r4d are arranged at non-uniform intervals, each antenna interval may be the same as the antenna interval of the transmit antennas t1d to t4d as illustrated in FIG. 2 or may be different. When the receive antennas r1d to r4d are arranged at a uniform interval, each antenna interval may be the same as or different from the antenna interval of the transmit antennas t1d to t4d. The X-coordinate of each of the receive antennas r1d to r4d may be the same as the X-coordinate of each of the transmit antennas t1d to t4d as illustrated in FIG. 2 or may be shifted.

The integrated circuit 14d and the transmit antennas t1d to t4d are connected by the lines. The integrated circuit 14d and the receive antennas r1d to r4d are connected by the lines.

In the radar system using the array antenna, the direction of arrival is estimated from the phase difference of the received electromagnetic wave between the antennas. When a uniform array antenna is used as the array antenna, a plurality of identical phase differences appear, and the received signal becomes redundant. As illustrated in FIG. 2, this redundancy no longer exists and the aperture length can be therefore expanded efficiently, in the radar device using the MRA antenna.

The radar units 10a and 10c are arranged such that an interval between the receive antenna r4a and the receive antenna r1c is 7λ. The receive antenna r4a is closest to the radar unit 10c among the receive antennas r1a to r4a of the radar unit 10a arranged on the Y-axis. The receive antenna r1c is closest to the radar unit 10a among the receive antennas r1c to r4c of the radar unit 10c arranged on the Y-axis.

When the antenna interval of the receive array antenna in each of the radar units 10a and 10c is λ, 2λ, and 3λ, a virtual array antenna with antenna intervals of λ to 6λ can be formed. In a case where the antenna interval of two closest antennas between the radar units 10a and 10c is set to 7λ, which is larger than or equal to a sum (6λ) of the antenna intervals λ, 2λ, and 3λ of the receive array antenna, when the receive antennas r1a to r4a of the radar unit 10a and the receive antennas r1c to r4c of the radar unit 10c are made to function as one array antenna, a virtual array antenna with an aperture length of 19λ and a uniform antenna interval λ can be formed, and the aperture length can be increased.

When the antennas of the receive array antenna in each of the radar units 10a and 10c are arranged at a uniform interval, for example, λ, a virtual array antenna with an aperture length of 3λ can be formed by four antennas. When an interval of two closest antennas between the radar units 10a and 10c is set to 4λ, a virtual array antenna with an aperture length of 10λ can be formed.

The radar units 10a and 10c are arranged such that an interval between the receive antenna r4a closest to the radar unit 10c among the receive antennas r1a to r4a of the radar unit 10a arranged on the Y-axis and the receive antenna r1c closest to the radar unit 10a among the receive antennas r1c to r4c of the radar unit 10c arranged on the Y-axis is 7λ. In this case, too, when the receive antennas r1b to r4b and the receive antennas r1d to r4d of the radar units 10b and 10d are made to function as an array antenna, a virtual array antenna having an aperture length of 19λ can be realized with uniform interval of antenna interval λ, and the aperture length can be further increased.

When the antennas of the receive array antenna in each of the radar units 10b and 10d are arranged at a uniform interval, for example, λ, a virtual array antenna with an aperture length of 3λ can be formed by four antennas and, when an interval of two closest antennas between the radar units 10b and 10d is set to 4λ, a virtual array antenna with an aperture length of 10λ can be formed.

Both the interval between the closest receive antennas of the radar units 10a and 10c and the interval between the closest receive antennas of the radar units 10b and 10d do not need to be 7λ, and either of the intervals may be other than 7λ.

In FIG. 2, the receive antennas r1a to r4a and r1c to r4c are arranged linearly on the Y-axis, but the receive antennas r1a to r4a and r1c to r4c do not need not be arranged on the same straight line but may be arranged on two straight lines parallel to the Y-axis, respectively.

Similarly, the receive antennas r1b to r4b and r1d to r4d do not need to be arranged on the same straight line but may be arranged on two straight lines parallel to the X-axis, respectively.

It has been described that the components of the radar units 10a to 10d are arranged on the substrates 12a to 12d, respectively, and that the substrates 12a to 12d are arranged on the radar panel 210a. However, the substrates 12a to 12d for the respective radar units 10a to 10d can be omitted. The components of the radar units 10a to 10d may be arranged directly on the radar panel 210a. In this case, the above-described substrates 12a to 12d are read as areas for arrangement of the radar units 10a to 10d.

The description of the longer sides and shorter sides of the substrates 12a to 12d has been made for convenience, and the longer side may be read as the shorter side, and the shorter side may be read as the longer side by changing the orientation of the substrates 12a-12d by 90 degrees.

Furthermore, the shape of the substrates 12a-12d is not limited to a rectangle, but may be a square, trapezoid, parallelogram, or a polygon with five or more corners. In this case, the longer sides of the above description may be read as two corresponding sides, and the shorter sides may be read as two other corresponding sides.

A mutual relationship among the four radar units 10a to 10d will be described.

First, the mutual relationship between the radar units 10a and 10b will be described. In the radar unit 10a, the transmit antennas t1a to t4a are arranged on the left side (negative side of the X-axis) of the integrated circuit 14a, and the receive antennas r1a to r4a are arranged on the right side (positive side of the X-axis) of the integrated circuit 14a. In the radar unit 10b, the transmit antennas t1b to t4b are arranged on the upper side (positive side of the Y-axis) of the integrated circuit 14b, and the receive antennas r1b to r4b are arranged on the lower side (negative side of the Y-axis) of the integrated circuit 14b.

The left and right sides of the integrated circuit are changed to the lower and upper sides of the integrated circuit when the integrated circuit is rotated clockwise by 90 degrees. For this reason, when the radar unit 10a is rotated clockwise by 90 degrees around the origin of the X-Y-coordinate system of the radar panel 210a, the radar unit 10a corresponds to the radar unit 10b. In other words, a relative position of the transmit array antenna (t1a-t4a) in the substrate 12a of the radar unit 10a corresponds to the relative position of the transmit array antenna (t1b-t4b) in the substrate 12b of the radar unit 10b. Similarly, a relative position of the receive array antenna (r1a-ra4) in the substrate 12a of the radar unit 10a corresponds to the relative position of the receive array antenna (r1b-r4b) in the substrate 12b of the radar unit 10b. The coordinates that are references to the relative positions may be the centers of the integrated circuits 14a and 14b.

For this reason, design of the antenna arrangement, wiring pattern, and the like of the radar unit 10b can be easily performed by only copying the design of the radar unit 10a (rotational movement and/or parallel shift).

The mutual relationship between the radar units 10c and 10d corresponds to the mutual relationship between the radar units 10a and 10b.

Next, the mutual relationship between the radar units 10a and 10c will be described. In the radar unit 10a, the transmit antennas t1a to t4a are arranged on the left side (negative side of the X-axis) of the integrated circuit 14a, and the receive antennas r1a to r4a are arranged on the right side (positive side of the X-axis) of the integrated circuit 14a. In the radar unit 10c, the transmit antennas t1b to t4b are arranged on the right side (positive side of the X-axis) of the integrated circuit 14c, and the receive antennas r1b to r4b are arranged on the left side (negative side of the X-axis) of the integrated circuit 14c.

When the radar unit 10a is rotated by 180 degrees about a straight line parallel to the shorter side of the radar unit 10a or substrate 12a, which passes through the center of the radar unit 10a and is parallel to the Y-axis, the front surface of the substrate 12a becomes the back surface thereof and the left and right sides of the integrated circuit 14a become the right and left sides thereof, respectively. In other words, a relative position in a substrate of a virtual transmit array antenna having a relationship in line symmetry with the transmit array antenna of the radar unit 10a with respect to a straight line which passes through the center of the substrate 12a and which is parallel to the shorter side of the substrate 12a, corresponds to a relative position in the substrate 12c of the transmit array antenna of the radar unit 10c. Similarly, a relative position in a substrate of a virtual receive array antenna having a relationship in line symmetry with the receive array antenna of the radar unit 10a with respect to a straight line which passes through the center of the substrate 12a and which is parallel to the shorter side of the substrate 12a, corresponds to a relative position in the substrate 12c of the receive array antenna of the radar unit 10c.

Figure 3B:
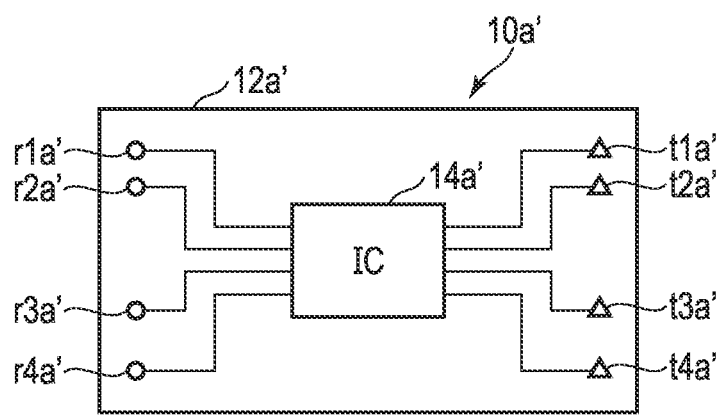

FIG. 3A illustrates the radar unit 10a. FIG. 3B illustrates a virtual radar unit 10a' formed by rotating the radar unit 10a by 180 degrees about a straight line which passes through the center of the substrate 12a and which is parallel to the shorter side of the substrate 12a. In the radar unit 10a', transmit antennas t1a' to t4a' are arranged on the right side of the integrated circuit 14a', and receive antennas r1a' to r4a' are arranged on the left side of the integrated circuit 14a'. In other words, a relative position of the transmit array antenna (t1a' to t4a') in the substrate 12a' of the radar unit 10a' corresponds to the relative position of the transmit array antenna (t1a to t4a) in the substrate 12c of the radar unit 10c. Similarly, a relative position of the receive array antenna in the substrate 12a' of the radar unit 10a' corresponds to the relative position of the receive array antenna in the substrate 12c of the radar unit 10c. The coordinates that are references to the relative positions may be the centers of the integrated circuits 14a and 14c. For this reason, design of the antenna arrangement, wiring pattern, and the like of the radar unit 10c can be easily performed by turning front back and copying the design of the radar unit 10a (rotational movement and/or parallel shift).

The mutual relationship between the radar units 10b and 10d corresponds to the mutual relationship between the radar units 10a and 10c.

Next, the configuration of the integrated circuits 14a to 14d included in the respective radar units 10a to 10d will be described. FIG. 4 is a block diagram illustrating the functional configuration of the integrated circuit 14a. The functional configuration of the integrated circuits 14b to 14d is also configured in the same manner.

The integrated circuit 14a includes a transmitter circuit 50 and receiver circuit 60. The transmitter circuit 50 includes a phase shifter 51 and amplifier 52. The receiver circuit 60 includes an amplifier 61, frequency converter 62, and analog to digital converter (ADC) 63. The transmit antennas t1a to t4a are connected to the transmitter circuit 50. The receive antennas r1a to r4a are connected to the receiver circuit 60.

The chirp signal output from the reference signal generation circuit 300 is first input to the phase shifter 51. The phase shifter 51 adjusts the phases of the chirp signals to be supplied to the four transmit antennas t1a to t4a. The phase-adjusted chirp signals are amplified by a predetermined number of times by the amplifier 52. The amplifier 52 includes the same number of amplifiers as the number of the transmit antennas t1a to t4a. Alternatively, the amplifier 52 may include a smaller number of amplifiers than the number of transmit antennas t1a to t4a and may sequentially supply the output of the phase shifter 51 to the plurality of antennas t1a to t4a.

The output of the amplifier 52 is transmitted sequentially from one of the transmit antennas t1a to t4a. Alternatively, the outputs of the amplifier 52 may be transmitted simultaneously from all or a part of the transmit antennas t1a to t4a.

The received signals received by the receive antennas r1a to r4a are adjusted to predetermined powers by the amplifier 61. The output signals of the amplifier 61 are input to a frequency converter 62. The amplifier 61 includes the same number of amplifiers as the number of receive antennas r1a to r4a. Alternatively, the amplifier 61 may include a smaller number of amplifiers than the number of receive antennas r1a to r4a and sequentially supply the received signals of the receive antennas r1a to r4a to the amplifiers.

The chirp signal output from the reference signal generation circuit 300 is also input to the frequency converter 62. The frequency converter 62 mixes the received signals with the chirp signal to generate intermediate frequency signals (IF signals). The IF signals are output to the ADC 63. The ADC 63 converts the IF signals into digital signals. The ADC 63 outputs the digitally converted IF signals to the signal processing circuit 400. The signal processing circuit 400 performs signal processing for the IF signals output from all the radar units of all the radar panels.

The chirp signal output from the reference signal generation circuit 300 is output to the transmitter circuits 50 and receiver circuits 60 in all the radar units 10 of all the radar panels 210 in the transmitter/receiver 200. As a result, the transmission operations from all the transmit array antennas of the transmitter/receiver 200 are controlled, the reception of all the receive array antennas are controlled, and interference between transmission and reception is prevented.

The reference clock output from the reference signal generation circuit 300 is also output to the transmitter circuits 50 and the receiver circuits 60 in all the radar units 10 of all the radar panels 210 in the transmitter/receiver 200. As a result, all the transmitter circuits 50 are synchronized and all the receiver circuits 60 are synchronized.

Next, details of the signal processing circuit 400 will be described with reference to FIG. 5 to FIG. 13. In the following description, the radar panel 210a will be used, but the same description can be applied to the radar panels 210b to 210d.

In the radar panel 210a, when the electromagnetic wave corresponding to the chirp signal is transmitted from the transmit array antenna of the radar unit 10a, the receive array antennas of the radar units 10a to 10d receive the reflected waves. Similarly, when the electromagnetic wave corresponding to the chirp signal is transmitted from the transmit array antenna of the radar unit 10b, the receive array antennas of the radar units 10a to 10d receive the reflected waves. When the electromagnetic wave corresponding to the chirp signal is transmitted from the transmit array antenna of the radar unit 10c, the receive array antennas of the radar units 10a to 10d receive the reflected waves. When the electromagnetic wave corresponding to the chirp signal is transmitted from the transmit array antenna of the radar unit 10c, the receive array antennas of the radar units 10a to 10d receive the reflected waves.

The IF signals output from the radar units 10a to 10d of the radar panel 210a are input to the calibration circuit 410.

In scanning the target person 600, when the distance between the target person 600 and the radar panel 210a is short, the difference in distance between the target person 600 and each of the radar units 10a to 10d is varied greatly. As a result, the phase difference of the IF signals output from the respective radar units 10a to 10d becomes remarkable, and a high precision inspection can hardly be performed. For this reason, when the distance between the target person 600 and the radar panel 210a is short, the calibration circuit 410 performs calibration on the IF signals.

Figure 5:
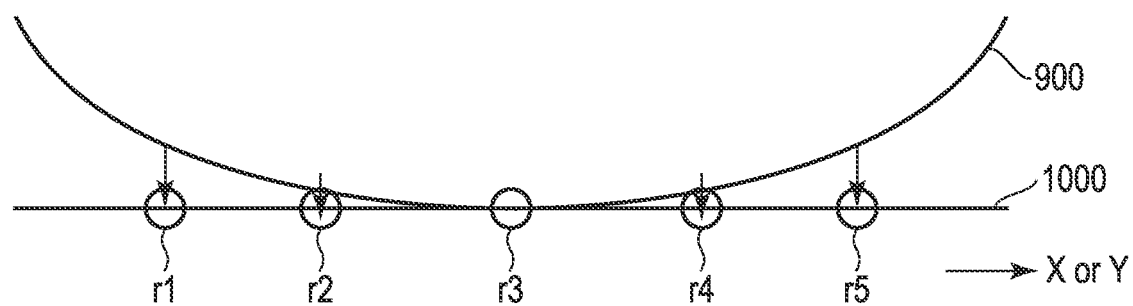
FIG. 5 is a view illustrating a concept of calibration according to the embodiment.

FIG. 5 is a view illustrating a concept of calibration. A receive array antenna including antennas r1, r2, r3, r4, and r5 is illustrated in FIG. 5.

When the distance between the radar panel 210a and the target person 600 is short, the electromagnetic wave which is reflected by the target person 600 and which is received by the receive array antenna becomes a spherical wave 900. In the spherical wave 900, the phases of the electromagnetic wave received by the receive antennas r1 to r5 differ greatly. More specifically, the reflected wave received by the receive antenna r3 is different in phase from the reflected wave received by the receive antenna r2 or r4, and the reflected wave received by the receive antenna r3 is further greatly different in phase from the reflected wave received by the receive antenna r1 or r5. Thus, to compensate for the phase difference of each of the receive antennas caused by the spherical wave 900, the calibration circuit 410 corrects the phase of the reflected wave such that the reflected wave arriving at each of the receive antennas is regarded as a flat incoming wave 1000. If the distance between the radar panel 210a and the target person 600 is sufficiently long, the electromagnetic wave received by the receive array antenna does not become the spherical wave 900, and the correction process performed by the calibration circuit 410 may be omitted.

The IF signals output from the calibration circuit 410 are input to the distance estimation circuit 420. According to the radar device 100 using FMCW modulation, the IF signals oscillate at a frequency corresponding to the distance between each of the radar panels and the target person 600. For this reason, the distance estimation circuit 420 performs a Fourier transform on the IF signals and calculates a range spectrum from the result of FFT. The distance estimation circuit 420 can estimate the range distance using a frequency with high power, from the result of the calculated range spectrum.

The virtual array extension circuit 430 forms a virtual array antenna. The virtual array antenna will be described below with reference to FIG. 6 to FIG. 9. Outlines of a MIMO array antenna and a MIMO-KR conversion virtual array antenna will be described here.

First, a MIMO array antenna will be described with reference to FIG. 6.

Figure 6:
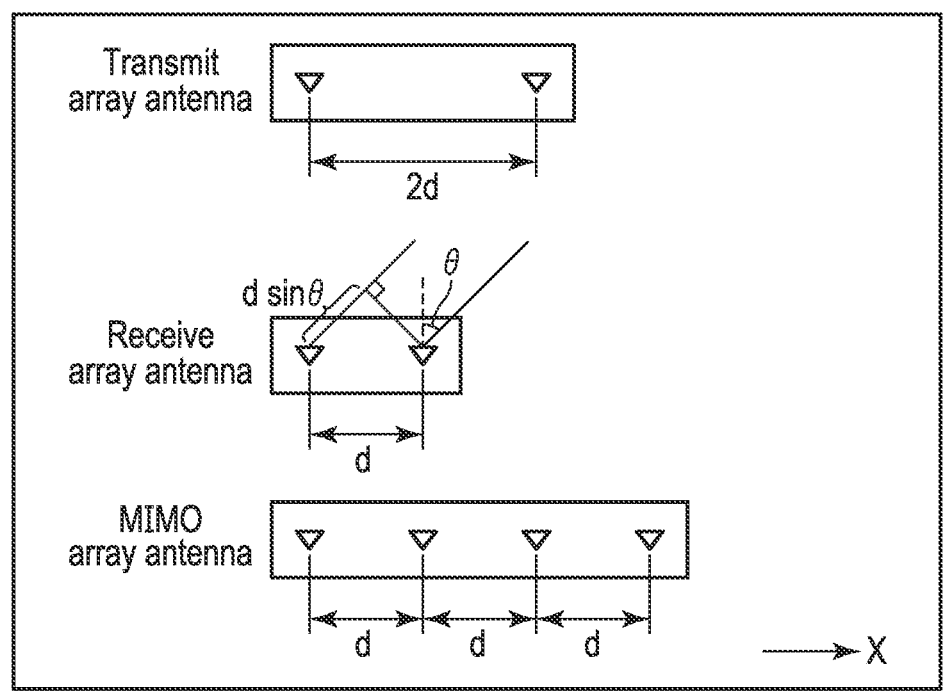
FIG. 6 is a diagram illustrates an example of a MIMO array antenna according to the embodiment.

FIG. 6 illustrates an example of a MIMO array antenna formed by a transmit array antenna and a receive array antenna. The transmit array antenna includes two antennas. The receive array antenna includes two antennas. The MIMO array antenna includes four antennas. The number of antennas of the transmit array antenna, the number of antennas of the receive array antenna, and the number of antennas of the MIMO array antenna illustrated in FIG. 6 are merely examples. When a transmit array antenna include Ntx transmit antennas and a receive array antenna include Nrx receive antennas, a MIMO array antenna including Ntx×Nrx antennas is formed.

According to the example illustrated in FIG. 6, two transmit antennas are arranged in the X direction with an interval of distance 2d. The transmit array antenna is a uniform linear array (ULA). Two receive antennas are arranged in the X direction with an interval of distance d. The receive array antenna is also a ULA. An example of the distance d is a half wavelength λ/2. It is assumed that the number of targets to estimate the direction is K and that electromagnetic wave arrive from each of the targets, i.e., K waves arrive in total.

A received signal x(t) based on the reflected wave received at a certain time t by the receive array antenna is expressed by expression 1.

$$x(t) = As(t) + n(t) \qquad \text{Equation 1}$$
$$= \sum_{k=1}^{K} a_t(\theta_k) \otimes a_r(\theta_k) s_k + n(t)$$

"A" refers to a mode matrix and "K" refers to an index of an incoming wave. Equation 1 means that the reflected electromagnetic waves arrive from the respective targets, i.e., K waves arrive in total.

s(t) refers to a complex amplitude vector of the received signal, n(t) refers to a noise vector at time t, θk refers to a direction of arrival of the electromagnetic wave from the k-th target, at(θk) refers to a mode vector of the transmit array antenna for an arriving k-th electromagnetic wave, and $a_r$(θk) refers to a mode vector of the receive array antenna for the arriving k-th electromagnetic wave.

A Kronecker product of $a_t$(θk) and $a_r$(θk) in Equation 1 is expressed below in Equation 2.

⊗ refers to a Kronecker product.

If $a_t$ (θk)⊗$a_r$ (θk) is regarded as mode vector a(θk) of the MIMO array antenna for any k, Equation 2 can be obtained.

$$a(\theta_k) = a_t(\theta_k) \otimes a_r(\theta_k) \qquad \text{Equation 2}$$
$$= \left[1, e^{j(2\pi/\lambda)2d\sin\theta_k}\right]^T \otimes \left[1, e^{j(2\pi/\lambda)d\sin\theta_k}\right]^T$$

If $\theta_k$=j(2π/λ) d·sin $\theta_k$, then the mode vector a($\theta_k$) of the MIMO array antenna for any k is expressed as Equation 3.

$$a(\theta_k) = \left[1, e^{2\phi_k}\right]^T \otimes \left[1, e^{\phi_k}\right]^T \qquad \text{Equation 3}$$
$$= \left[1, e^{\phi_k}, e^{2\phi_k}, e^{3\phi_k}\right]$$

Equation 3 indicates that the mode vector a($\theta_k$) of the MIMO array antenna includes four phase states 0, ϕk, 2ϕk, and 3ϕk. This means that the MIMO array antenna including four antennas arranged in the X direction with the interval of distance d is formed of two transmit antennas and two receive antennas.

Figure 7:
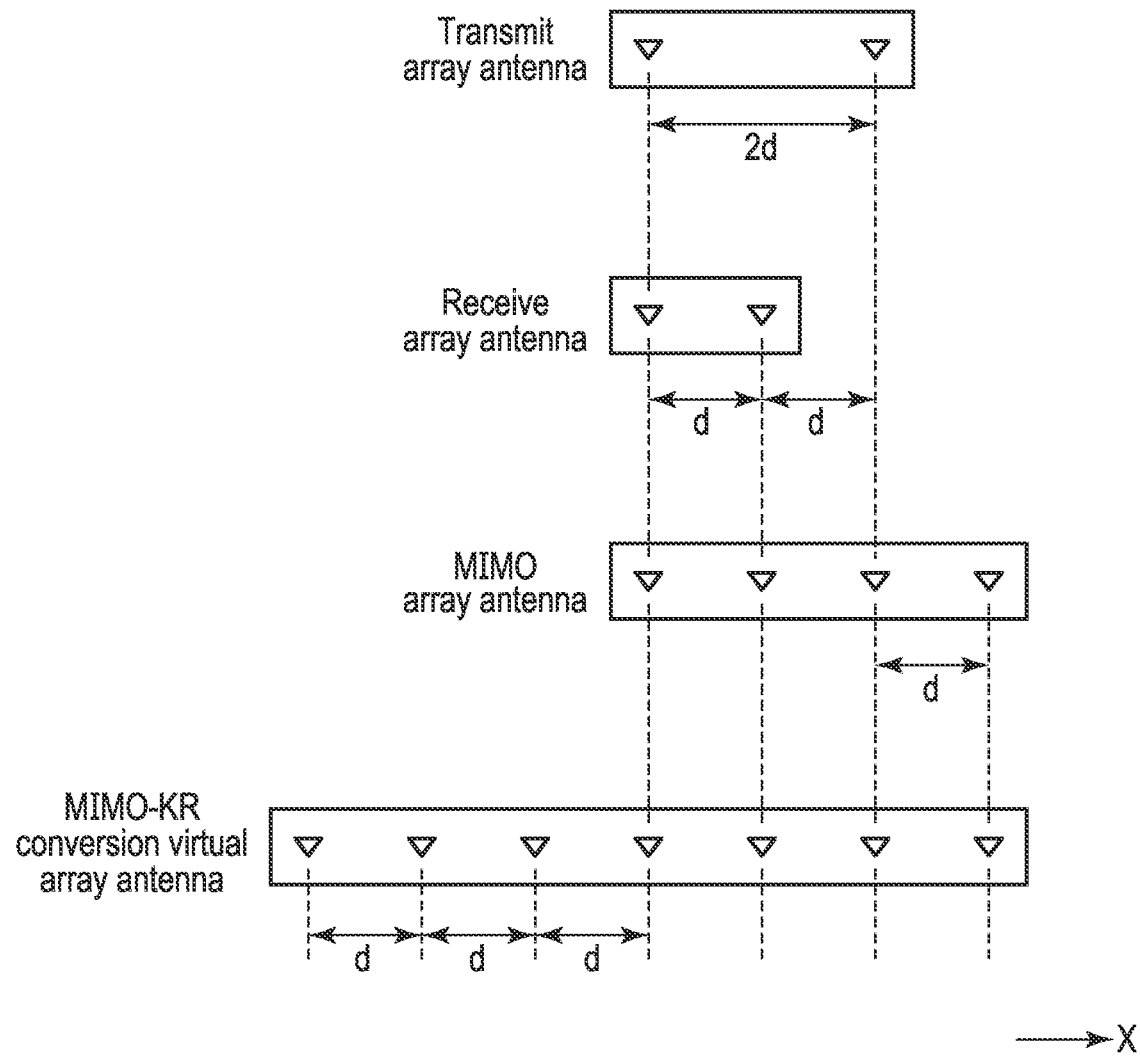
FIG. 7 is a diagram illustrates an example of a MIMO-KR conversion virtual array antenna according to the embodiment.

Next, a MIMO-KR conversion virtual array antenna will be described with reference to FIG. 7.

A virtual array antenna including more antennas than the MIMO array antenna illustrated in FIG. 6 can be formed by applying Kahtri-Rao (KR) conversion to the received signal x(t) based on the reflected wave received by the receive array antenna in FIG. 6.

Details of the KR conversion and the MIMO-KR conversion virtual array antenna formation will be described below. The KR conversion is the signal processing for extending the dimension of the mode vector of the MIMO array antenna, using non-overlapping elements of a correlation matrix.

A correlation matrix Rxx for the received signal (i.e., the received signal by the signal processing of the MIMO array antenna) x(t) from the receive array antenna illustrated in FIG. 6 is calculated as follows.

$$R_{XX} = E[x(t)x(t)^H]$$
$$= ASA^H + R_N$$
Equation 4

E [·] refers to the ensemble mean, and H refers to the Hermitian transpose. In addition, S refers to a source correlation matrix, and $R_N$ refers to a noise correlation matrix. It is assumed below that the power of the signal source is 1. This allows S to be regarded as a unit matrix. In addition, it is assumed that noise is negligibly small. Therefore, $R_N$ can be regarded as a zero matrix. Based on the above, the KR conversion is applied to the MIMO array antenna illustrated in FIG. 6.

The correlation matrix for the received signal performed by the MIMO array antenna illustrated in FIG. 6 is expressed in Equation 5.

$$R_{xx} = ASA^H$$
$$= a(\theta_k)a(\theta_k)^H$$
$$= \begin{bmatrix} 1 & e^{-\phi_k} & e^{-2\phi_k} & e^{-3\phi_k} \\ e^{\phi_k} & 1 & e^{-\phi_k} & e^{-2\phi_k} \\ e^{2\phi_k} & e^{\phi_k} & 1 & e^{-\phi_k} \\ e^{3\phi_k} & e^{2\phi_k} & e^{\phi_k} & 1 \end{bmatrix}$$
Equation 5

When the vector including the non-overlapping element of the correlation matrix $R_{XX}$ illustrated in Equation 5 is referred to as $z_e$, $z_e$ is expressed by Equation 6.

$$z_e = [e^{-3\phi k}, e^{-2\phi k}, e^{-1\phi k}, 1, e^{\phi k}, e^{2\phi k}, e^{3\phi k}]^T$$
Equation 6

Equation 6 indicates that the mode vector a(θk) of the MIMO array antenna includes seven phase states 0, ±φk, ±2φk, and ±3φk. This means that the MIMO-KR conversion virtual array antenna including seven virtual antennas arranged in the X direction with the interval of distance d is formed.

Thus, the MIMO-KR conversion virtual array antenna including 2×Ntx×Nrx-1 virtual antennas arranged in the X direction with the interval of distance d is formed by applying the KR conversion to the MIMO array antenna formed of Ntx transmit antennas and Nrx receive antennas. The operation of obtaining the correlation matrix of the received signal and obtaining the vector $z_e$ including non-overlapping elements, which is illustrated by Equations 4 to 6, is referred to as KR conversion.

The overlapping elements still remain in the correlation matrix indicated by Equation 5. More specifically, nine of sixteen matrix components indicated by Equation 5 are overlapping components. Thus, it can be understood that there is room to improve the formation efficiency of the MIMO-KR conversion virtual array antenna.

When the KR conversion is applied to the MIMO array antenna, the correlation matrix with overlapping elements is calculated. The overlapping elements are caused by receive and transmit array antennas of ULA. The overlapping elements of the correlation matrix can be reduced if at least one of the receive array antenna and transmit array antenna is formed of MRA.

The MIMO-KR conversion virtual array antenna formed by applying the KR conversion to the receive array antenna of MRA, or the receive array antenna of MRA, or both of them, will be described below.

Figure 8:
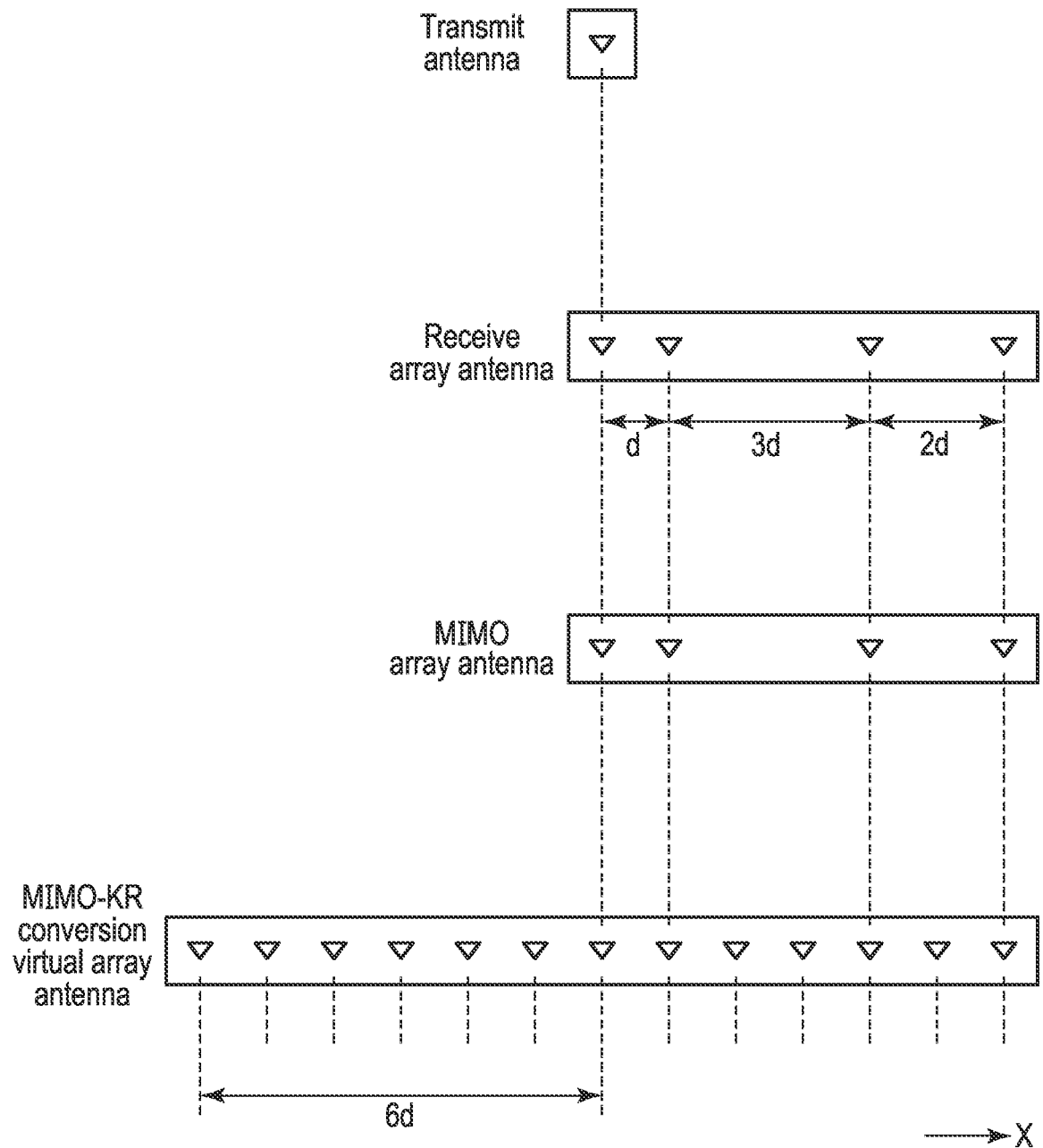
FIG. 8 is a diagram illustrates another example of a MIMO-KR conversion virtual array antenna according to the embodiment.

FIG. 8 illustrates an example of the MIMO-KR conversion virtual array antenna formed upon using one transmit antenna and the receive array antenna of MRA which includes four receive antennas.

The mode vector a(θk) of the MIMO array antenna for any k∈ K in the example of FIG. 8 is expressed in Equation 7. In addition, the correlation matrix $R_{XX}$ generated by applying the KR conversion after forming the MIMO array antenna, based on the received signal processed in the example illustrated in FIG. 8 is expressed in Equation 8.

$$a(\theta_k) = a_t(\theta_k) \otimes a_r(\theta_k)$$
$$= [1, e^{\phi_k}, e^{4\phi_k}, e^{6\phi_k}]^T$$
Equation 7

$$R_{xx} = a(\theta_k)a(\theta_k)^H$$
$$= \begin{bmatrix} 1 & e^{-\phi_k} & e^{-4\phi_k} & e^{-6\phi_k} \\ e^{\phi_k} & 1 & e^{-3\phi_k} & e^{-5\phi_k} \\ e^{4\phi_k} & e^{3\phi_k} & 1 & e^{-2\phi_k} \\ e^{6\phi_k} & e^{5\phi_k} & e^{2\phi_k} & 1 \end{bmatrix}$$
Equation 8

According to Equation 8, it can be understood that the number of the non-overlapping elements of sixteen matrix components is thirteen. In other words, it can be understood that the MIMO-KR conversion virtual array antenna is formed of thirteen virtual antennas in the example illustrated in FIG. 8.

Figure 9:
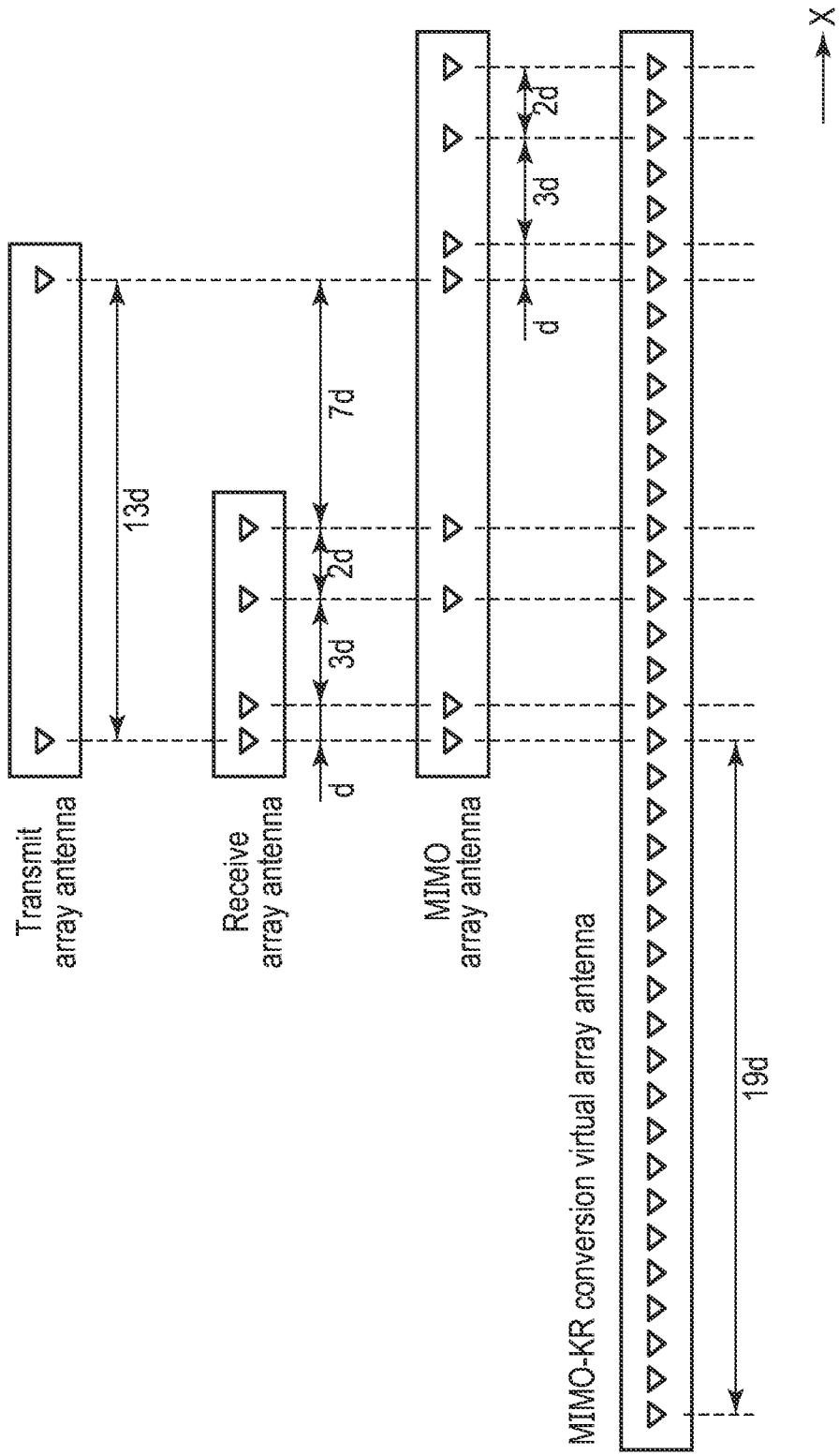
FIG. 9 is a diagram illustrates still another example of a MIMO-KR conversion virtual array antenna according to the embodiment.

FIG. 9 illustrates an example of the MIMO-KR conversion virtual array antenna formed by using the transmit array antenna including two transmit antennas and the receive array antenna of MRA which includes four receive antennas. In this case, the mode vector a(θk) of the MIMO array antenna for any k∈ K is expressed in Equation 9.

$$a(\theta_k) = a_t(\theta_k) \otimes a_r(\theta_k)$$
$$= [1, e^{13\phi_k}] \otimes [1, e^{\phi_k}, e^{4\phi_k}, e^{6\phi_k}]$$
$$= [1, e^{\phi_k}, e^{4\phi_k}, e^{6\phi_k}, e^{13\phi_k}, e^{14\phi_k}, e^{17\phi_k}, e^{19\phi_k}]$$
Equation 9

The correlation matrix generated by applying the KR conversion after forming the MIMO array antenna, based on the received signal processed in the example illustrated in FIG. 9 is omitted, but the number of the non-overlapping elements of the correlation matrix are thirty-nine. As a result, it can be understood that the MIMO-KR conversion virtual array antenna is formed of thirty-nine virtual antennas in the example illustrated in FIG. 9.

In other words, comparison FIG. 8 with FIG. 9 indicates that in FIG. 9, the number of virtual antennas is increased by twenty-six by merely increasing one transmit antenna and one receive antenna with respect to the example of FIG. 8. The MIMO-KR conversion virtual array antenna can be therefore formed efficiently.

Based on the above, the virtual array antenna can be formed efficiently by the MIMO-KR conversion and the aperture length of the antenna can be extend by using the array antenna of MRA rather than the array antenna of ULA.

An example of the virtual array formed by the virtual array extension circuit 430 will be described.

Figure 10:
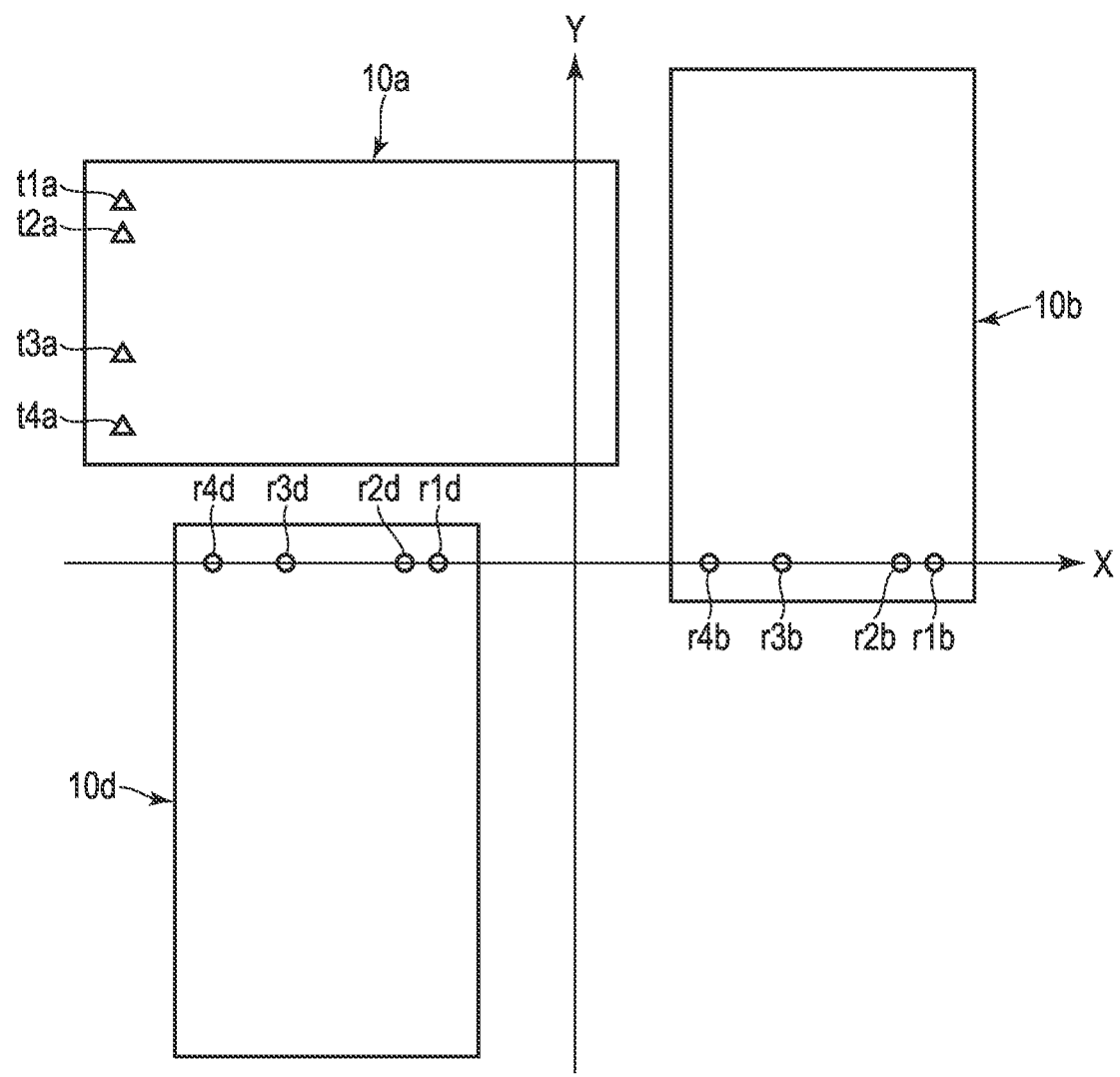
FIG. 10 is a diagram illustrates an example of a radar panel according to the embodiment.
Figure 21:
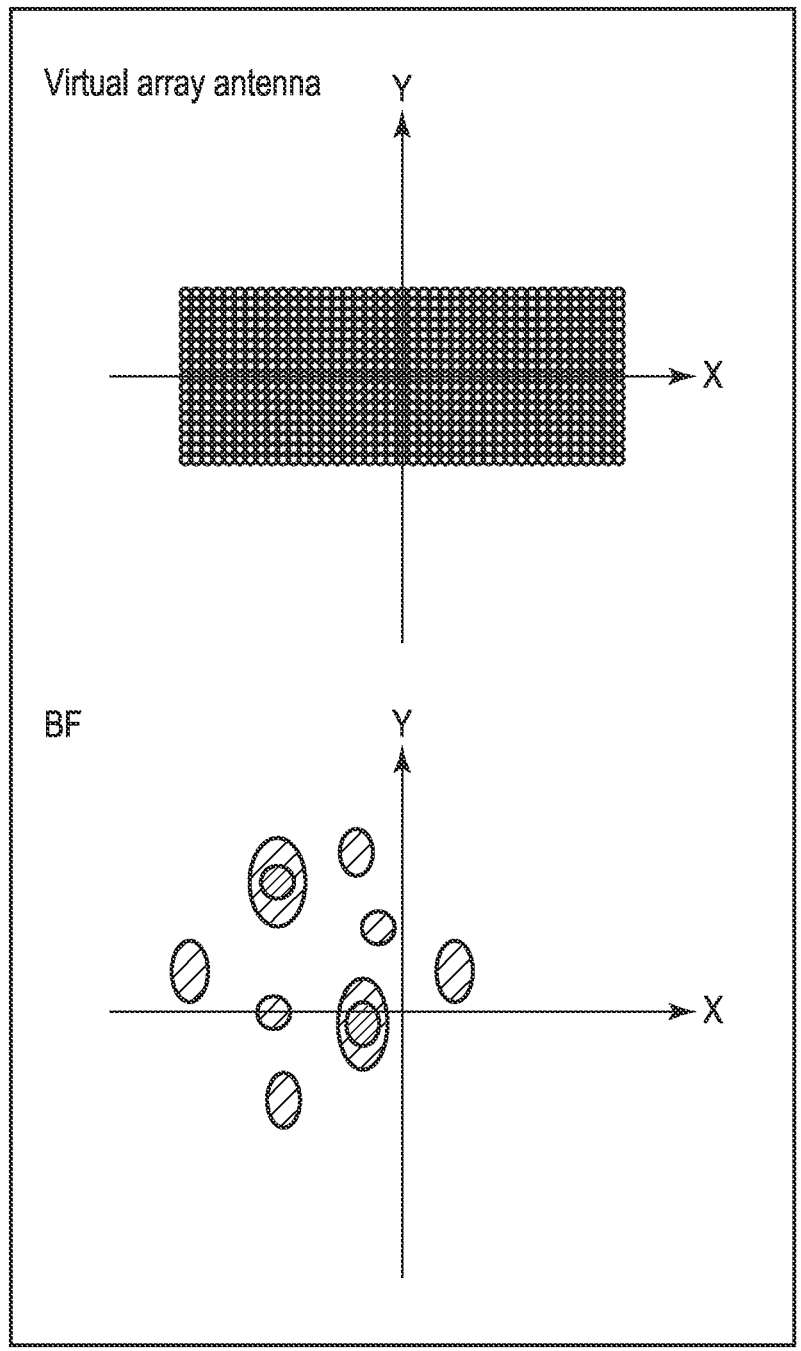
FIG. 21 illustrates a beamforming result based on a planar virtual array antenna according to the embodiment.

FIG. 10 illustrates a case where the transmit antennas t1a to t4a of the radar unit 10a transmit electromagnetic waves, and the receive antennas r1b to r4b of the radar unit 10b and the receive antennas r1d to r4d of the radar unit 10d receive the reflected waves. FIG. 21 illustrates an example of a virtual array antenna formed by the virtual array extension circuit 430 in this case.

Figure 11:
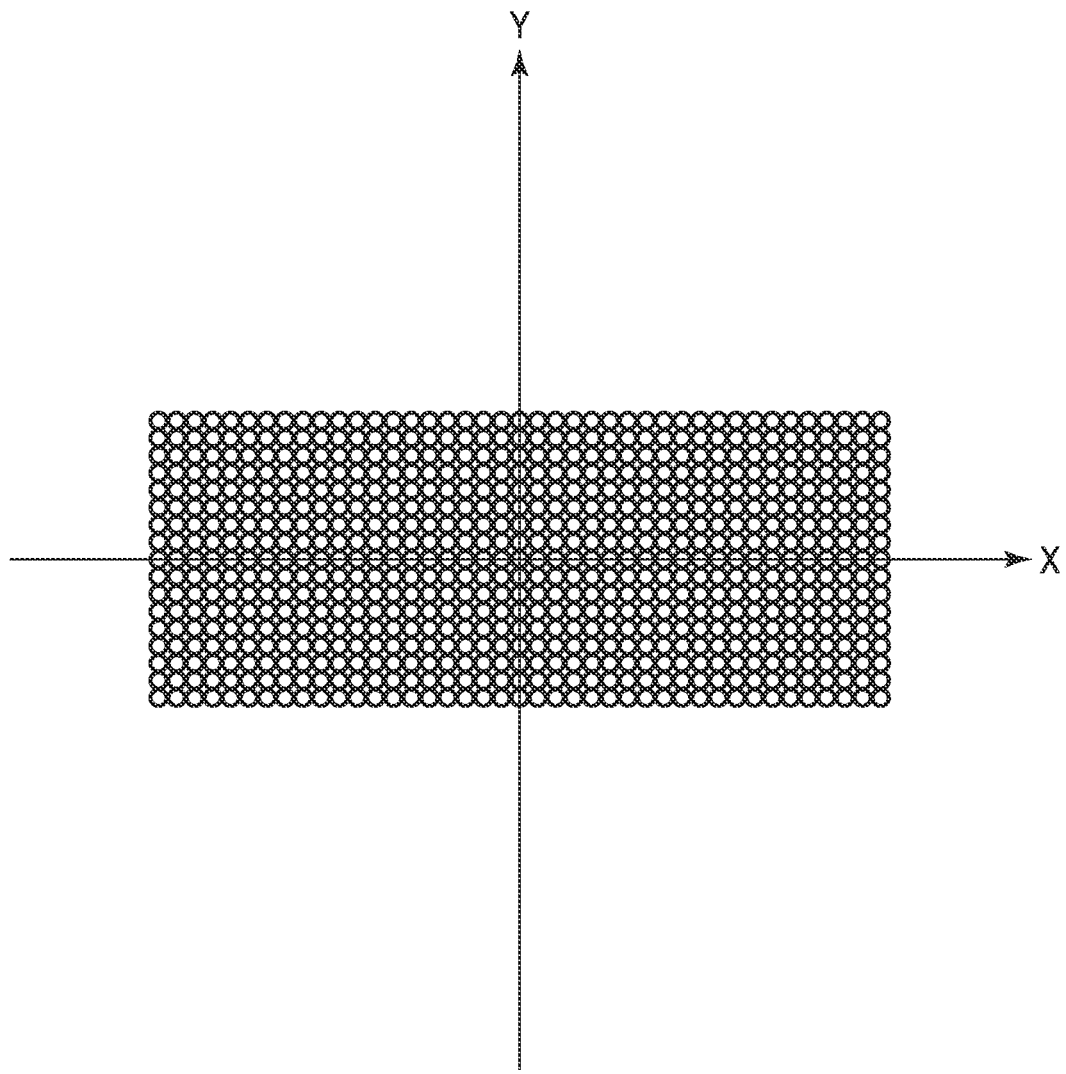
FIG. 11 is a diagram illustrates an example of a virtual array antenna formed by the radar panel according to the embodiment.

The virtual array antenna illustrated in FIG. 11 is a planar array antenna in which the virtual antennas are arranged at a uniform interval in a rectangular range. The aperture length of this planar array antenna is large in the X direction and small in the Y direction.

Figure 12:
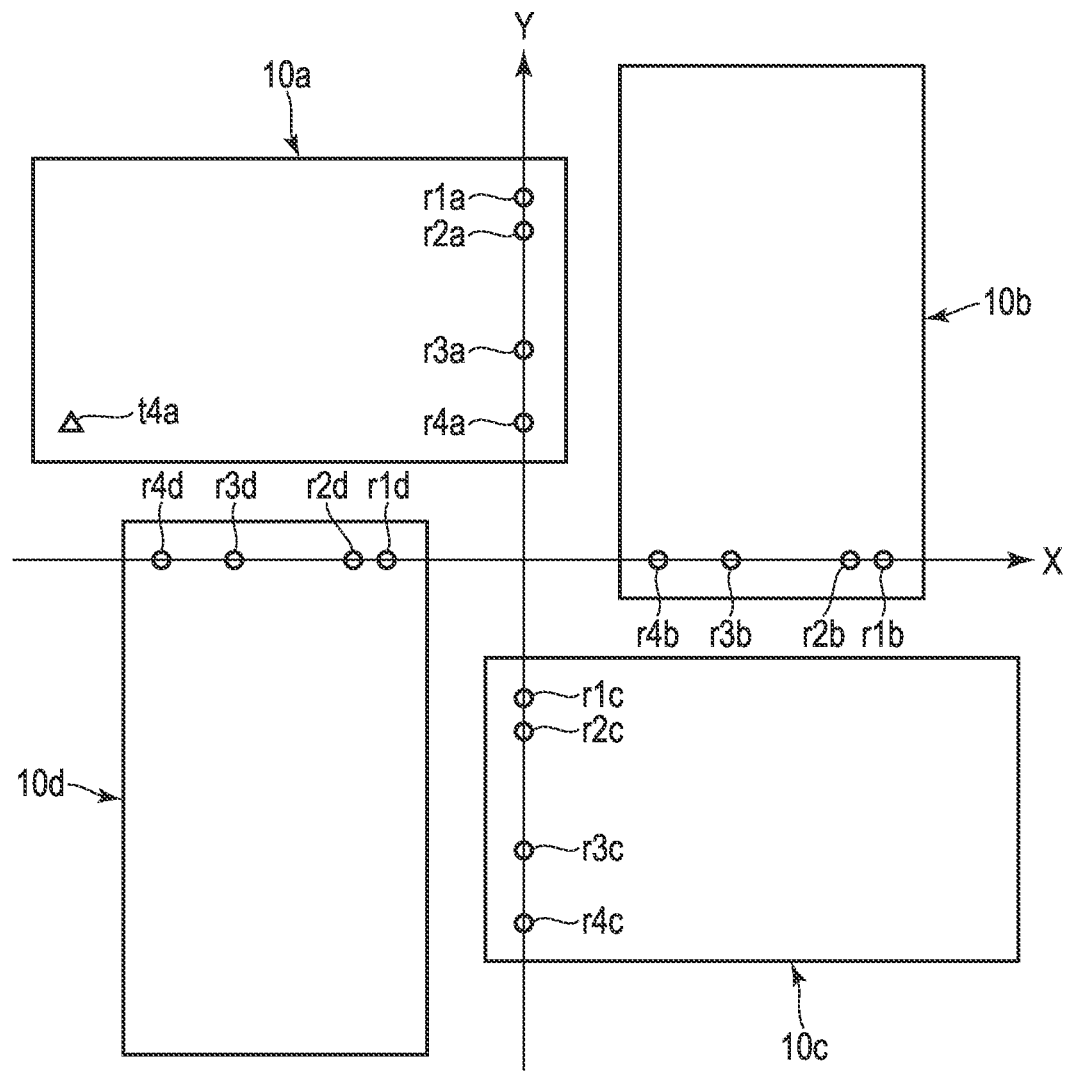
FIG. 12 is a diagram illustrates another example of a radar panel according to the embodiment.
Figure 13:
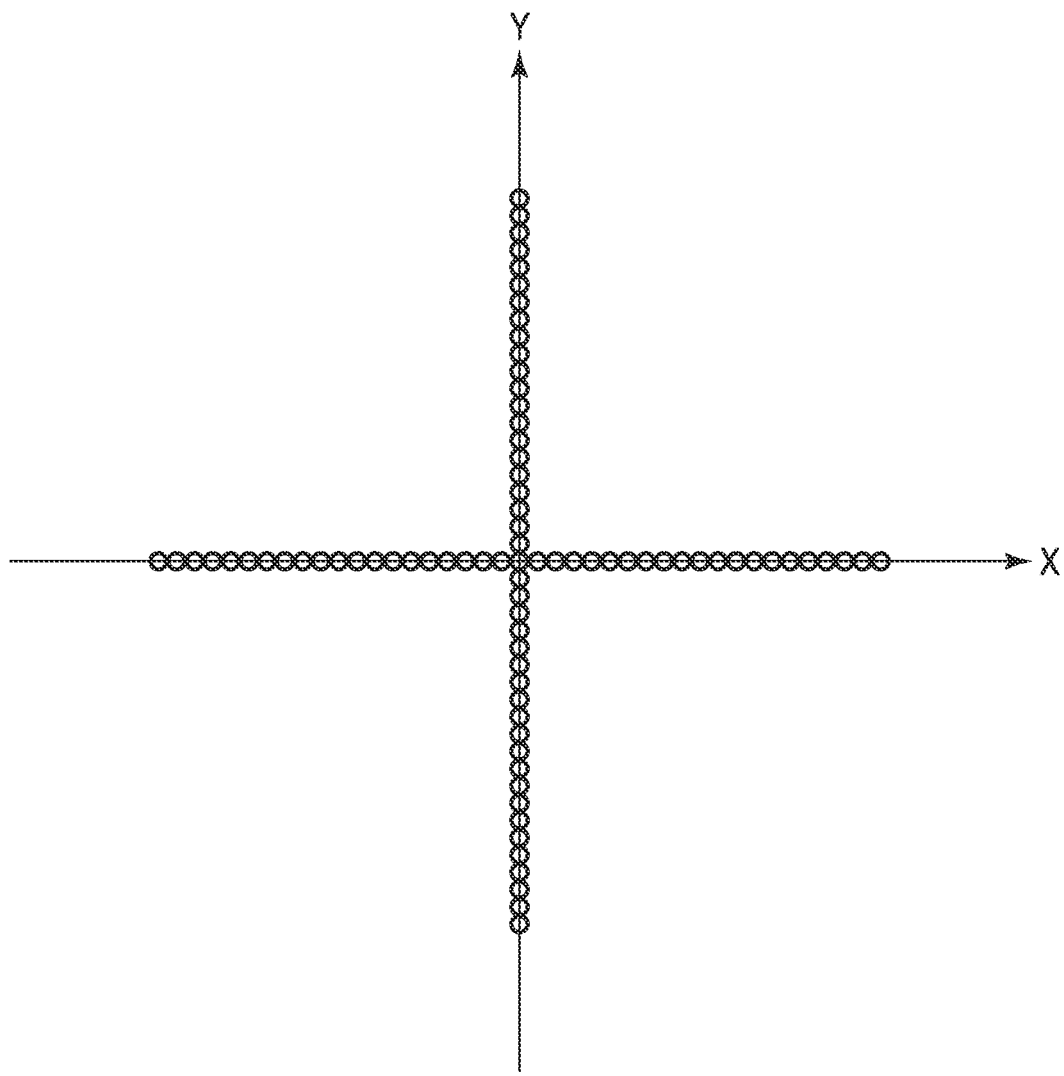
FIG. 13 is a diagram illustrates another example of a virtual array antenna formed by the radar panel according to the embodiment.

FIG. 12 illustrates a case where the transmit antenna t4a of the radar unit 10a transmits an electromagnetic wave, and the receive antennas r1a to r4a of the radar unit 10a, the receive antennas r1b to r4b of the radar unit 10b, the receive antennas r1c to r4c of the radar unit 10c, and the receive antennas r1d to r4d of the radar unit 10d receive the reflected waves. FIG. 13 illustrates an example of a virtual array antenna formed by the virtual array extension circuit 430 in this case.

The virtual array antenna illustrated in FIG. 13 is a cross-shaped array antenna in which the virtual antennas are arranged at a uniform interval in a cross shape. The aperture length of this cross-shaped array antenna is equal in the X direction and the Y direction.

An array antenna with a sharp beam can be formed by using the planar array antenna and the cross-shaped array antenna together.

The arrival direction estimation circuit 440 estimates the angle of arrival of the reflected waves, based on the received signals of the virtual array antenna (for example, the information on the phase difference based on the array intervals of the receive antennas) output from the virtual array extension circuit 430. A beamforming method, MUSIC method, ESPRIT method, and the like are used to estimate the angle of arrival of the reflected waves. The beamforming method is used in the embodiments. In the beamforming method, correlation values between the received signals and a weight ω are calculated.

The weight ω is expressed in Equation 10.

$$\omega=[w_{1,1},w_{1,2},\ldots w_{p,q}]$$  Equation 10

Each of p and q corresponds to the number of antennas in the virtual receive array antenna to be formed. In addition, $w_{p,q}$ are expressed in Equation 11 for any p∈ p and any q∈ q.

$$\omega_{p,q} = \exp\left(j\frac{2\pi}{\lambda}(p-1)d\sin\theta_i\cos\phi_k + j\frac{2\pi}{\lambda}(q-1)d\sin\theta_i\sin\phi_k\right)$$ Equation 11

The correlation values are calculated sequentially for a sweep angle (θi, φk).

A beamforming result BF calculated by the arrival direction estimation circuit 440 is expressed in Equation 12.

$$BF(\theta,\varphi)=\omega R_{yy}\omega^H$$  Equation 12 where $R_{yy}=E[yy^H]$

The BF is obtained as an evaluation function relating to the sweep angle (direction). The arrival direction estimation circuit 440 outputs the values calculated based on the BF in order of larger values as the directions of arrival of the reflected waves.

Figure 14:
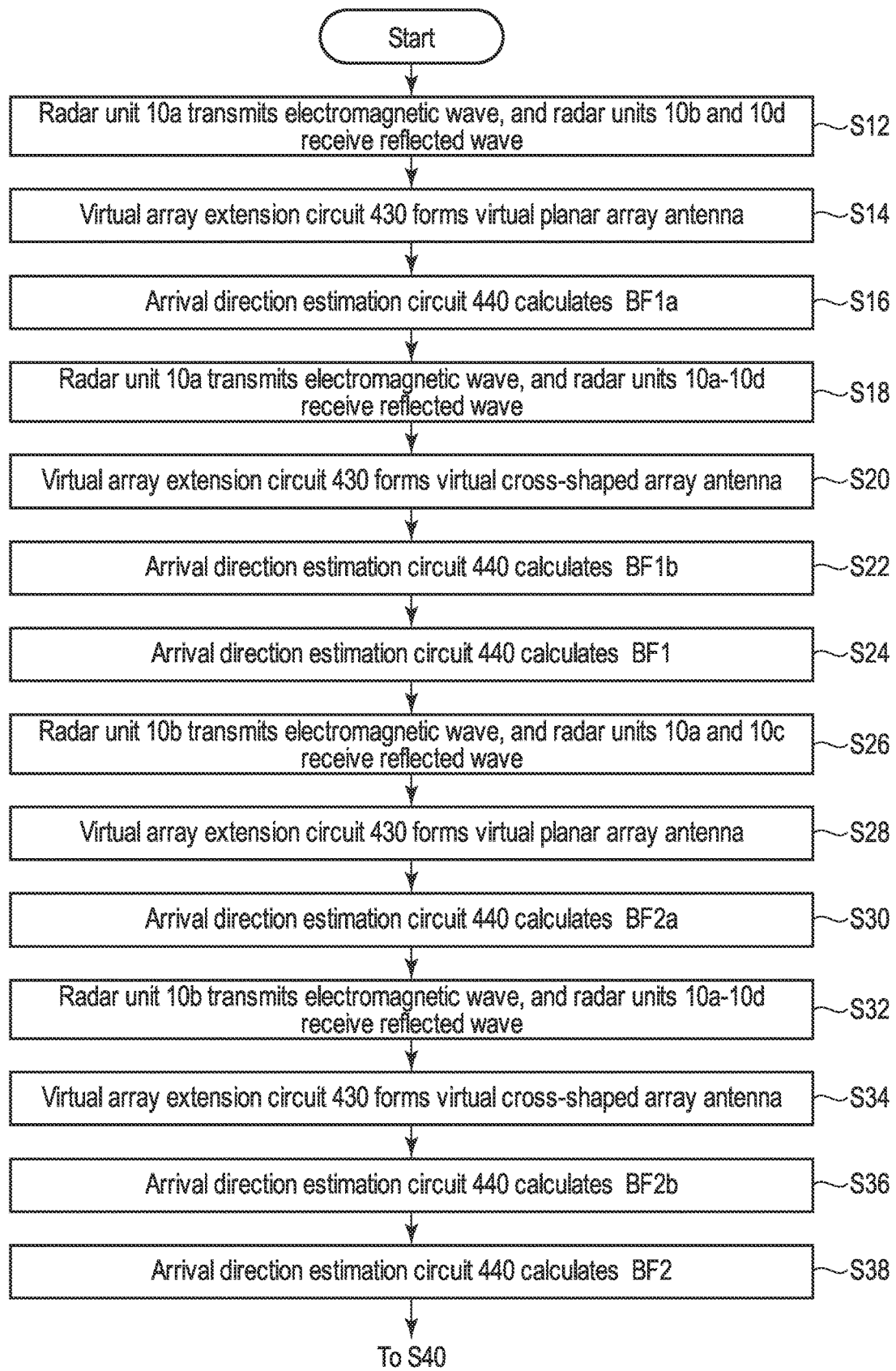
FIG. 14 is a flowchart illustrating the operation of a radar device according to the embodiment.
Figure 15:
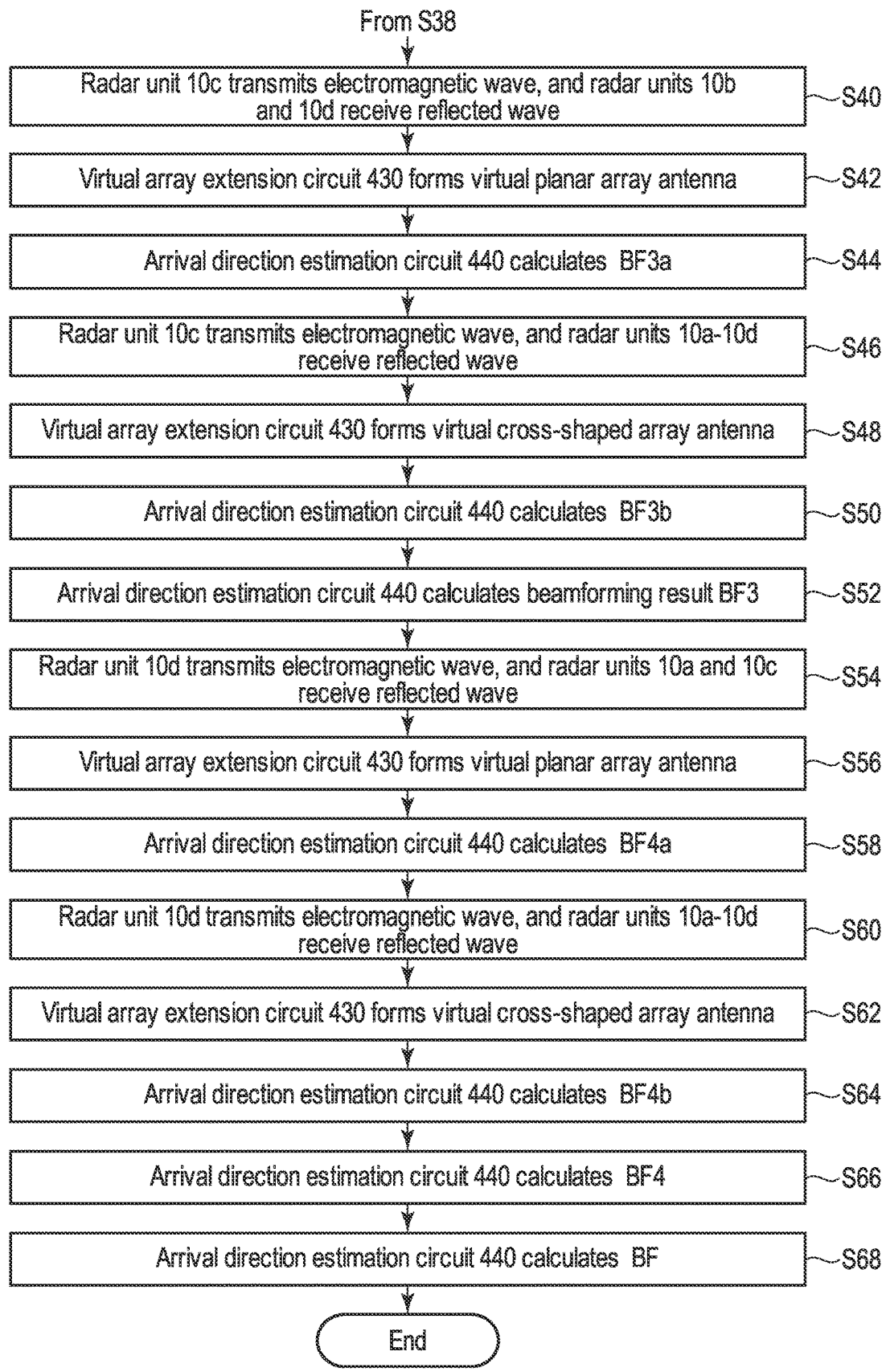
FIG. 15 is a flowchart illustrating the operation of a radar device according to the embodiment.

Next, the operation of the radar system 100 will be described with reference to FIG. 14 and FIG. 15. FIG. 14 and FIG. 15 are flowcharts illustrating the operations of the radar panel 210a and the signal processing circuit 400 under the control of the controller 500.

Figure 16A:
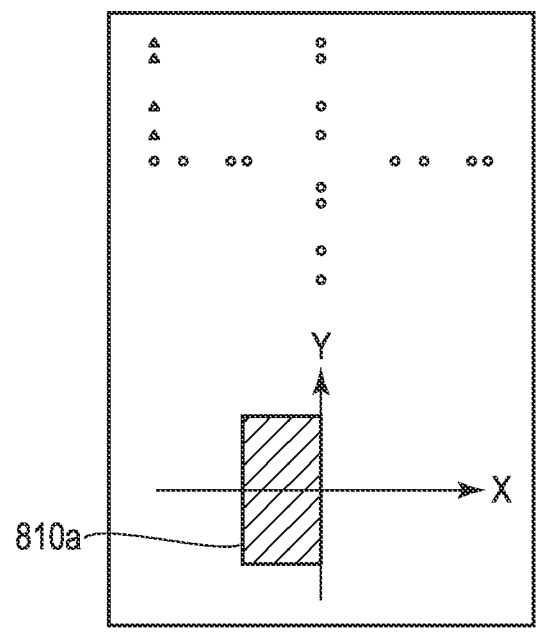
FIG. 16A, FIG. 16B, FIG. 16C, and FIG. 16D illustrate examples of assigning scanning areas for radar units.

The transmit antennas t1a to t4a of the radar unit 10a transmit electromagnetic waves, and the receive antennas r1b to r4b of the radar unit 10b and the receive antennas r1d to r4d of the radar unit 10d receive the reflected waves (see FIG. 10), thereby scanning a partial area of the inspection area 800 (step S12). An example of the scanning area is an area 810a (second and third quadrants) where the values of the X-coordinates are negative as illustrated in FIG. 16A. The scanning area is the main emission area of the electromagnetic waves and, in fact, the electromagnetic waves are also transmitted to the surrounding of the scanning area.

Figure 16B:
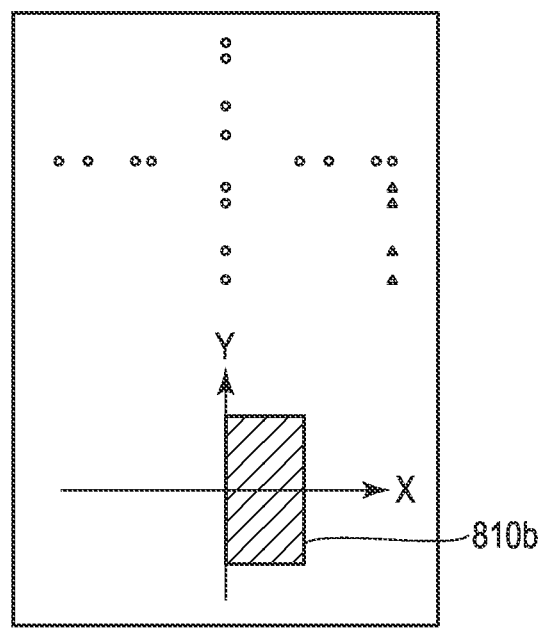
Figure 16C:
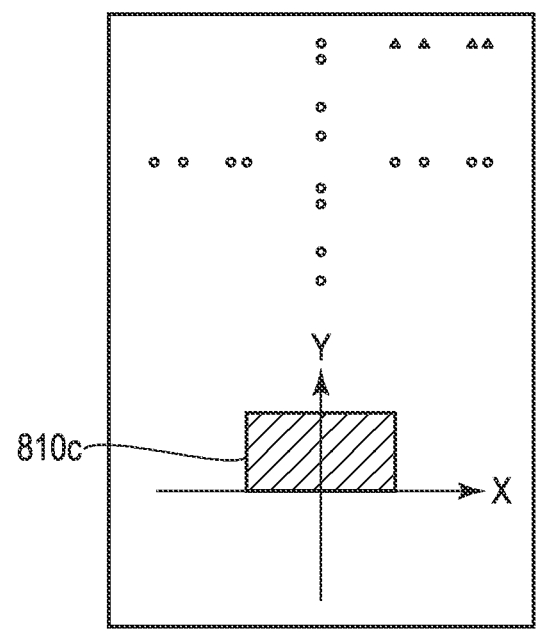
Figure 16D:
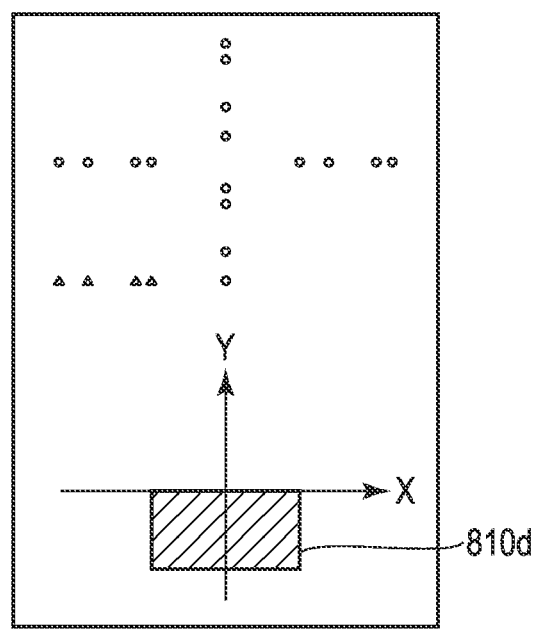

FIG. 16A, FIG. 16B, FIG. 16C, and FIG. 16D illustrate examples of assigning a partial area in the inspection space 800 for each transmit radar unit. In FIG. 16A, FIG. 16B, FIG. 16C, and FIG. 16D, the inspection space 800 is depicted as a front surface viewed from the radar panel 210A. FIG. 16A illustrates the scanning area 810a assigned to the transmit antennas t1a to t4a of the radar unit 10a. FIG. 16B illustrates the scanning area 810b assigned to the transmit antennas t1b to t4b of the radar unit 10b. The scanning area 810b is in the first and fourth quadrants where the values of the X-coordinates are positive. FIG. 16C illustrates the scanning area 810c assigned to the transmit antennas t1c to t4c of the radar unit 10c. The scanning area 810c is in the first and second quadrants where the values of the Y-coordinates are positive. FIG. 16D illustrates the scanning area 810d assigned to the transmit antennas t1d to t4d of the radar unit 10d. The scanning area 810d is in the third and fourth quadrants where the values of the Y-coordinates are negative.

The descriptions will return to those of FIG. 14 and FIG. 15, the virtual array extension circuit 430 forms a virtual array antenna, based on the IF signal generated by the scanning in step S12 (step S14). The virtual array antenna formed in step S14 is a planar array antenna as illustrated in FIG. 11.

The arrival direction estimation circuit 440 calculates a beamforming result BF1a, based on the received signal output from the virtual array extension circuit 430 (step S16).

The transmit antenna t4a of the radar unit 10a transmits an electromagnetic wave, and the receive antennas r1a to r4a of the radar unit 10a, the receive antennas r1b to r4b of the radar unit 10b, the receive antennas r1c to r4c of the radar unit 10c, and the receive antennas r1d to r4d of the radar unit 10d receive the reflected waves (see FIG. 12), thereby scanning a partial area of the inspection space 800 (step S18). An example of the scanning area is the scanning area 810a.

The virtual array extension circuit 430 forms a virtual array antenna, based on the IF signal generated by the scanning in step S18 (step S20). The virtual array antenna formed in step S20 is a cross-shaped array antenna as illustrated in FIG. 13.

The arrival direction estimation circuit 440 calculates a beamforming result BF1b, based on the received signal output from the virtual array extension circuit 430 (step S22).

The arrival direction estimation circuit 440 calculates a beamforming result BF1 by combining the beamforming result BF1a with the beamforming result BF1b (step S24). A virtual array antenna with a sharp beam can be formed and the angular resolution can be improved, by synthesizing the beamforming result BF1a of the planar virtual array antenna with the beamforming result BF1b of the cross-shaped virtual array antenna. The synthesis of the beamforming results will be described later with reference to FIG. 19 to FIG. 22.

The transmit antennas t1b to t4b of the radar unit 10b transmit electromagnetic waves, and the receive antennas r1a to r4a of the radar unit 10a and the receive antennas r1c to r4c of the radar unit 10c receive the reflected waves, thereby scanning a partial area of the inspection space 800 (step S26). An example of the scanning area is the area 810b (first and fourth quadrants) where the values of the X-coordinates are positive as illustrated in FIG. 16B.

The virtual array extension circuit 430 forms a virtual array antenna, based on the IF signal generated by the scanning in step S26 (step S28). The virtual array antenna formed in step S28 is a planar array antenna as illustrated in FIG. 11.

The arrival direction estimation circuit 440 calculates a beamforming result BF2a, based on the received signal output from the virtual array extension circuit 430 (step S30).

The transmit antenna t4b of the radar unit 10b transmits an electromagnetic wave, and the receive antennas r1a to r4a of the radar unit 10a, the receive antennas r1b to r4b of the radar unit 10b, the receive antennas r1c to r4c of the radar unit 10c, and the receive antennas r1d to r4d of the radar unit 10d receive the reflected waves (see FIG. 12), thereby scanning a partial area of the inspection space 800 (step S32). An example of the scanning area is the scanning area 810b.

The virtual array extension circuit 430 forms a virtual array antenna, based on the IF signal generated by the scanning in step S32 (step S34). The virtual array antenna formed in step S34 is a cross-shaped array antenna as illustrated in FIG. 13.

The arrival direction estimation circuit 440 calculates a beamforming result BF2b, based on the received signal output from the virtual array extension circuit 430 (step S36).

The arrival direction estimation circuit 440 calculates a beamforming result BF2 by combining the beamforming result BF2a with the beamforming result BF2b (step S38).

The transmit antennas t1c to t4c of the radar unit 10c transmit electromagnetic waves, and the receive antennas r1b to r4b of the radar unit 10b and the receive antennas r1d to r4d of the radar unit 10d receive the reflected waves, thereby scanning a partial area of the inspection area 800 (step S40). An example of the scanning area is the area 810c (first and second quadrants) where the values of the Y-coordinates are positive as illustrated in FIG. 16C.

The virtual array extension circuit 430 forms a virtual array antenna, based on the IF signal generated by the scanning in step S40 (step S42). The virtual array antenna formed in step S42 is a planar array antenna as illustrated in FIG. 11.

The arrival direction estimation circuit 440 calculates a beamforming result BF3a, based on the received signal output from the virtual array extension circuit 430 (step S44).

The transmit antenna t4c of the radar unit 10c transmits an electromagnetic wave, and the receive antennas r1a to r4a of the radar unit 10a, the receive antennas r1b to r4b of the radar unit 10b, the receive antennas r1c to r4c of the radar unit 10c, and the receive antennas r1d to r4d of the radar unit 10d receive the reflected waves, thereby scanning a partial area of the inspection space 800 (step S46). An example of the scanning area is the scanning area 810c.

The virtual array extension circuit 430 forms a virtual array antenna, based on the IF signal generated by the scanning in step S46 (step S48). The virtual array antenna formed in step S48 is a cross-shaped array antenna as illustrated in FIG. 13.

The arrival direction estimation circuit 440 calculates a beamforming result BF3b, based on the received signal output from the virtual array extension circuit 430 (step S50).

The arrival direction estimation circuit 440 calculates a beamforming result BF3 by combining the beamforming result BF3a with the beamforming result BF3b (step S52).

The transmit antennas t1d to t4d of the radar unit 10d transmit electromagnetic waves, and the receive antennas r1a to r4a of the radar unit 10a and the receive antennas r1c to r4c of the radar unit 10c receive the reflected waves, thereby scanning a partial area of the inspection space 800 (step S454). An example of the scanning area is an area 810d (third and fourth quadrants) where the values of the Y-coordinates are negative as illustrated in FIG. 16D.

The virtual array extension circuit 430 forms a virtual array antenna, based on the IF signal generated by the scanning in step S54 (step S56). The virtual array antenna formed in step S56 is a planar array antenna as illustrated in FIG. 11.

The arrival direction estimation circuit 440 calculates a beamforming result BF4a, based on the received signal output from the virtual array extension circuit 430 (step S58).

The transmit antenna t4d of the radar unit 10d transmits an electromagnetic wave, and the receive antennas r1a to r4a of the radar unit 10a, the receive antennas r1b to r4b of the radar unit 10b, the receive antennas r1c to r4c of the radar unit 10c, and the receive antennas r1b to r4b of the radar unit 10b receive the reflected waves, thereby scanning a partial area of the inspection space 800 (step S60). An example of the scanning area is the scanning area 810d.

The virtual array extension circuit 430 forms a virtual array antenna, based on the IF signal generated by the scanning in step S60 (step S62). The virtual array antenna formed in step S62 is a cross-shaped array antenna as illustrated in FIG. 13.

The arrival direction estimation circuit 440 calculates a beamforming result BF4b, based on the received signal output from the virtual array extension circuit 430 (step S64).

The arrival direction estimation circuit 440 calculates a beamforming result BF4 by combining the beamforming result BF4a with the beamforming result BF4b (step S66).

The arrival direction estimation circuit 440 calculates a beamforming result BF by combining the beamforming results BF1, BF2, SBF3, and BF4 (step S68).

In steps S12, S18, S26, S32, S40, S46, S54, and S60, the phase shift in the transmitted signals can be reduced by assigning the partial areas of the inspection area to each of the radar units 10a to 10d as the scanning areas. However, each of the radar units 10a to 10d may scan the entire inspection area. In this case, only one of the radar units 10a to 10d may transmit electromagnetic waves and only two radar units may receive the reflected waves. In other words, any one of the processes in steps S12 to S24 in FIG. 14, the processes in steps S16 to S38 in FIG. 14, the processes in steps S40 to S52 in FIG. 15, and the processes in steps S54 to S68 in FIG. 15 may be executed.

In the operations of the radar device 100 illustrated in FIG. 14 and FIG. 15, the number of radar units transmitting the electromagnetic wave is a single number. However, electromagnetic waves may be transmitted simultaneously from a plurality of radar units.

Figure 17:
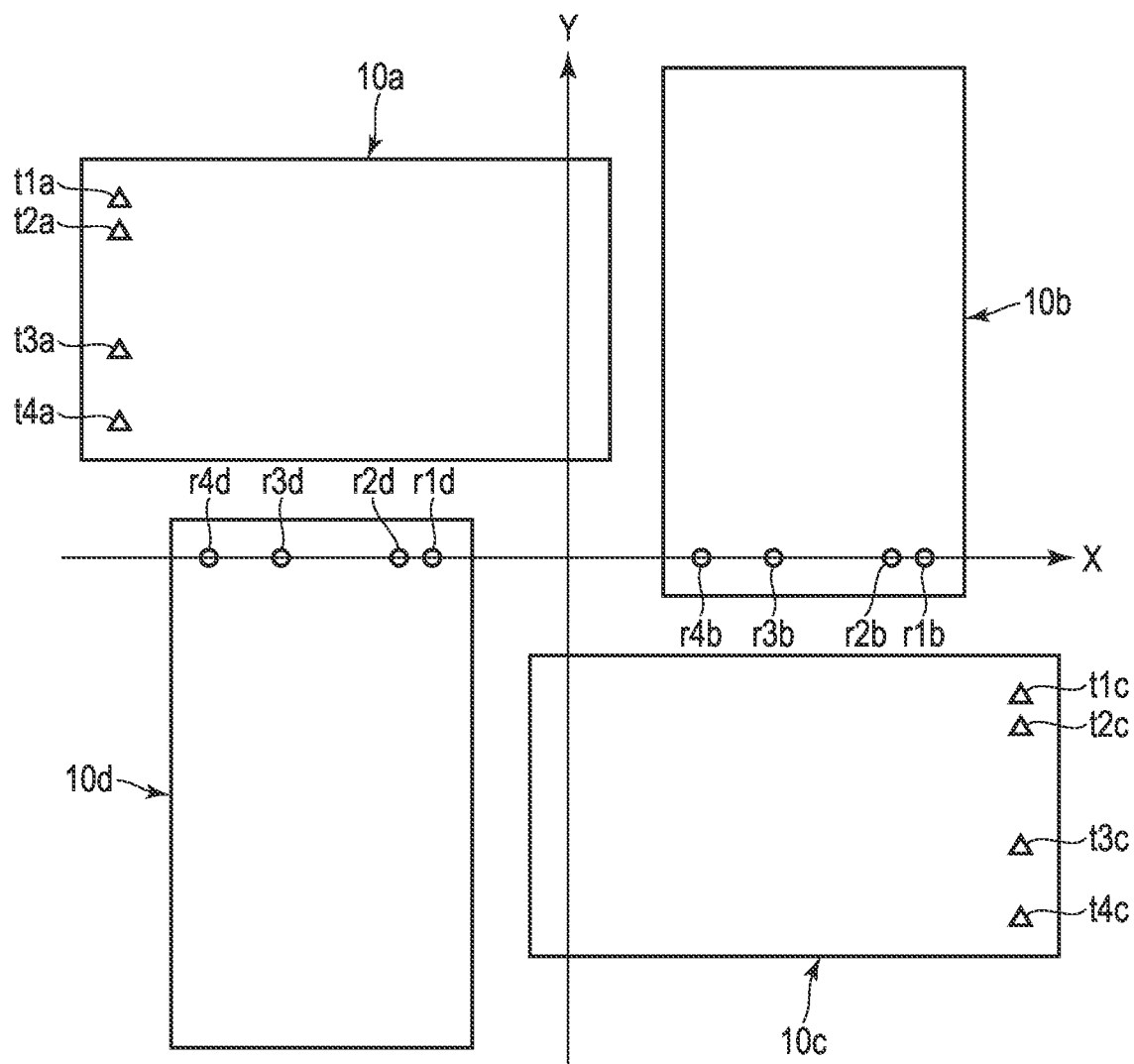
FIG. 17 is a diagram illustrates still another example of a radar panel according to the embodiment.

FIG. 17 is a diagram illustrating a situation in which electromagnetic waves are simultaneously transmitted from the radar units 10a and 10c and the reflected waves are received by the radar units 10b and 10d. The transmit antennas t1a to t4a of the laser unit 10a and the transmit antennas t1c to t4c of the laser unit 10c transmit electromagnetic waves. The receive antennas r1b to r4b of the laser unit 10b and the receive antennas r1d to r4d of the laser unit 10d, which are arranged on the X-axis, receive the reflected waves.

Figure 18:
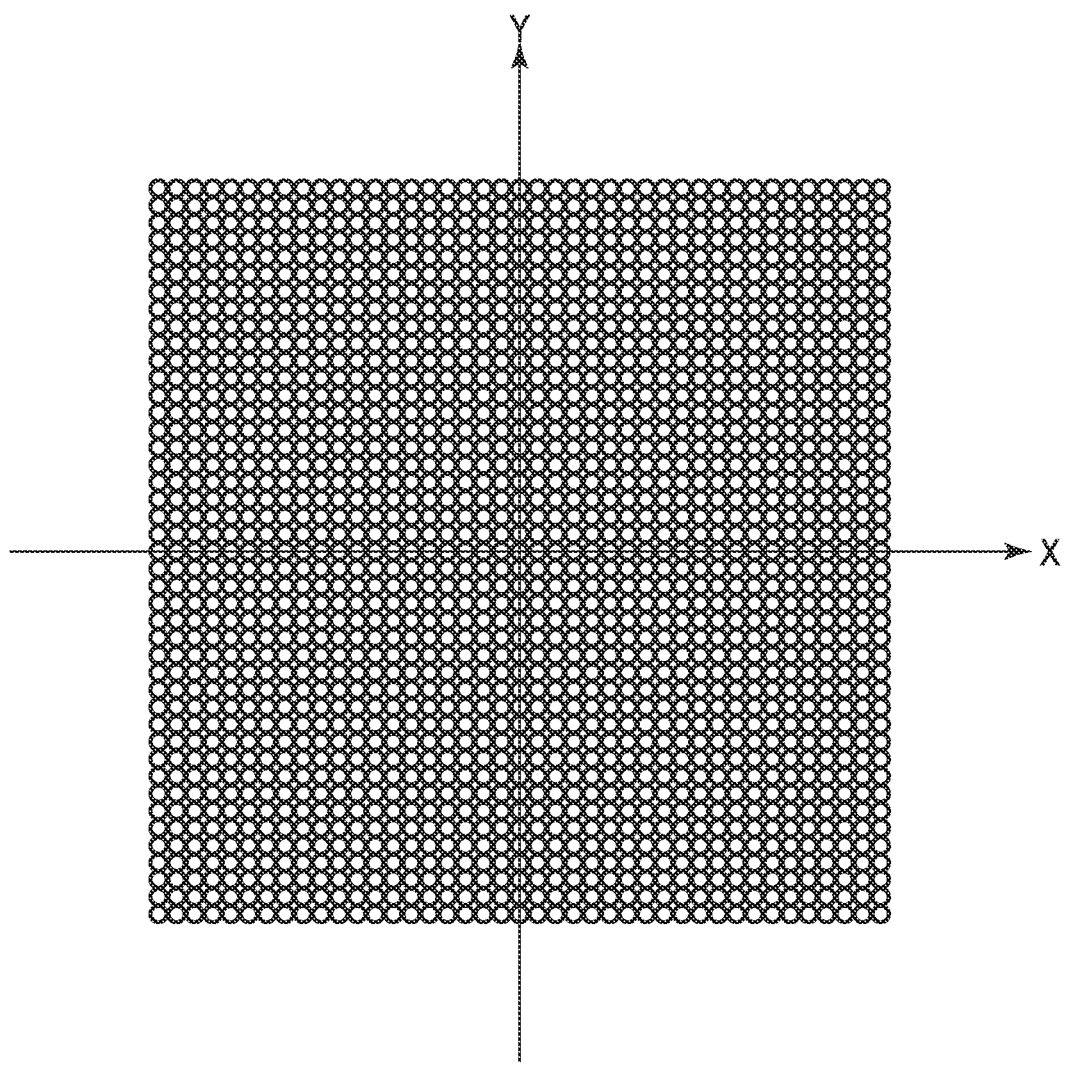
FIG. 18 is a diagram illustrates still another example of a virtual array antenna formed by the radar panel according to the embodiment.

FIG. 18 illustrates an example of a virtual array antenna formed by the transmission and reception illustrated in FIG. 17. The virtual array antenna illustrated in FIG. 18 is wider in the Y direction than the virtual array antenna illustrated in FIG. 11.

The beamforming result calculated by the arrival direction estimation circuit 440 will be described with reference to FIG. 19 to FIG. 22.

Figure 19:
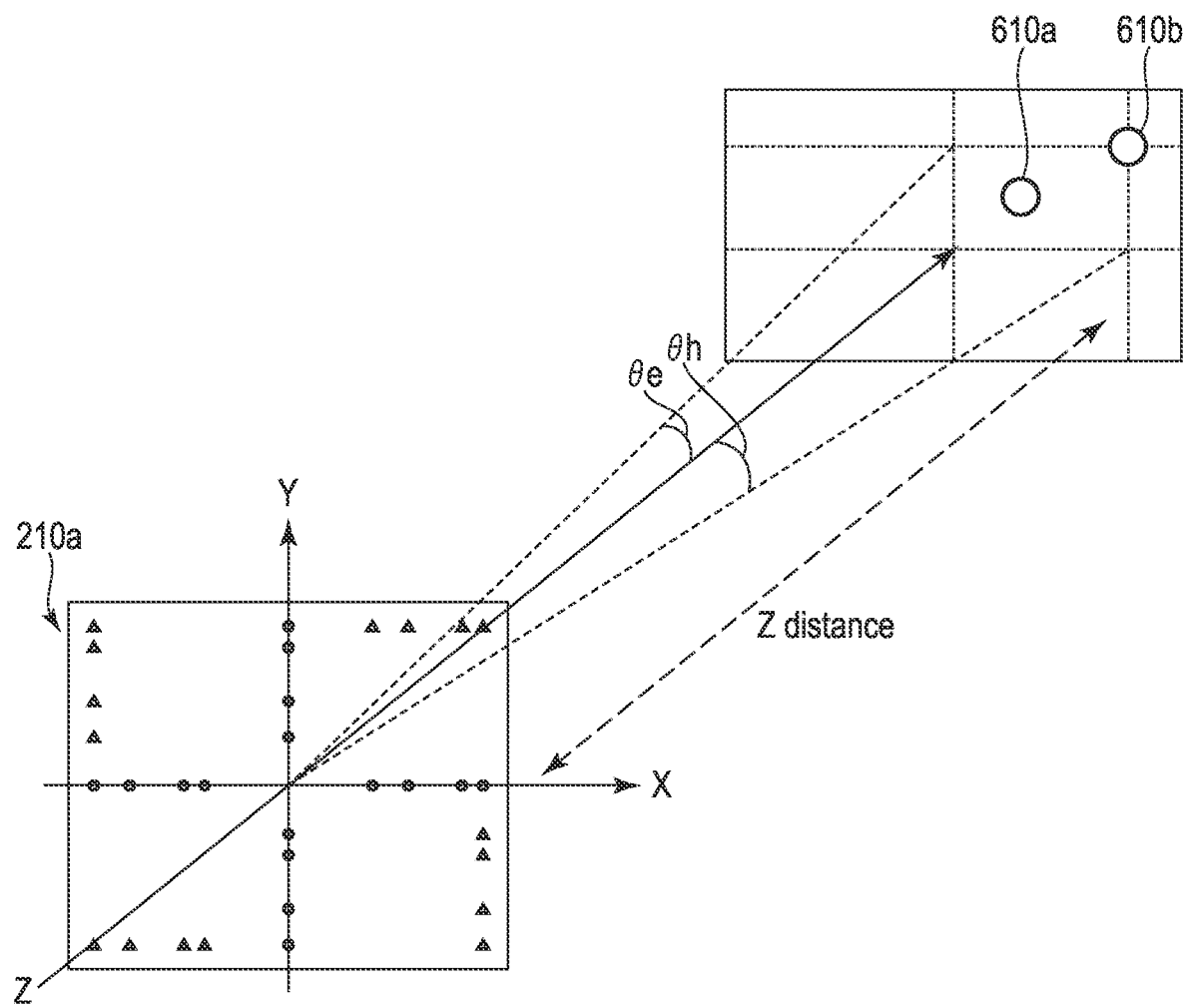
FIG. 19 is a diagram illustrating an example of arrival direction estimation according to the embodiment.

According to the embodiment of the radar device 100, even in a case where the target person 600 holds a plurality of dangerous objects 610, they can be detected with high angular resolution and high accuracy. In FIG. 19, it is assumed that the target person 600 conceals, for example, two adjacent dangerous objects 610a and 610b in a pocket of clothes. It is assumed that the radar panel 210a scans, for example, a range of elevation angle θe and depression angle θh about the Z-axis. In the example illustrated in FIG. 19, an example of the beamforming result calculated by the arrival direction estimation circuit 440 is illustrated in FIG. 20, FIG. 21, and FIG. 22.

Figure 20:
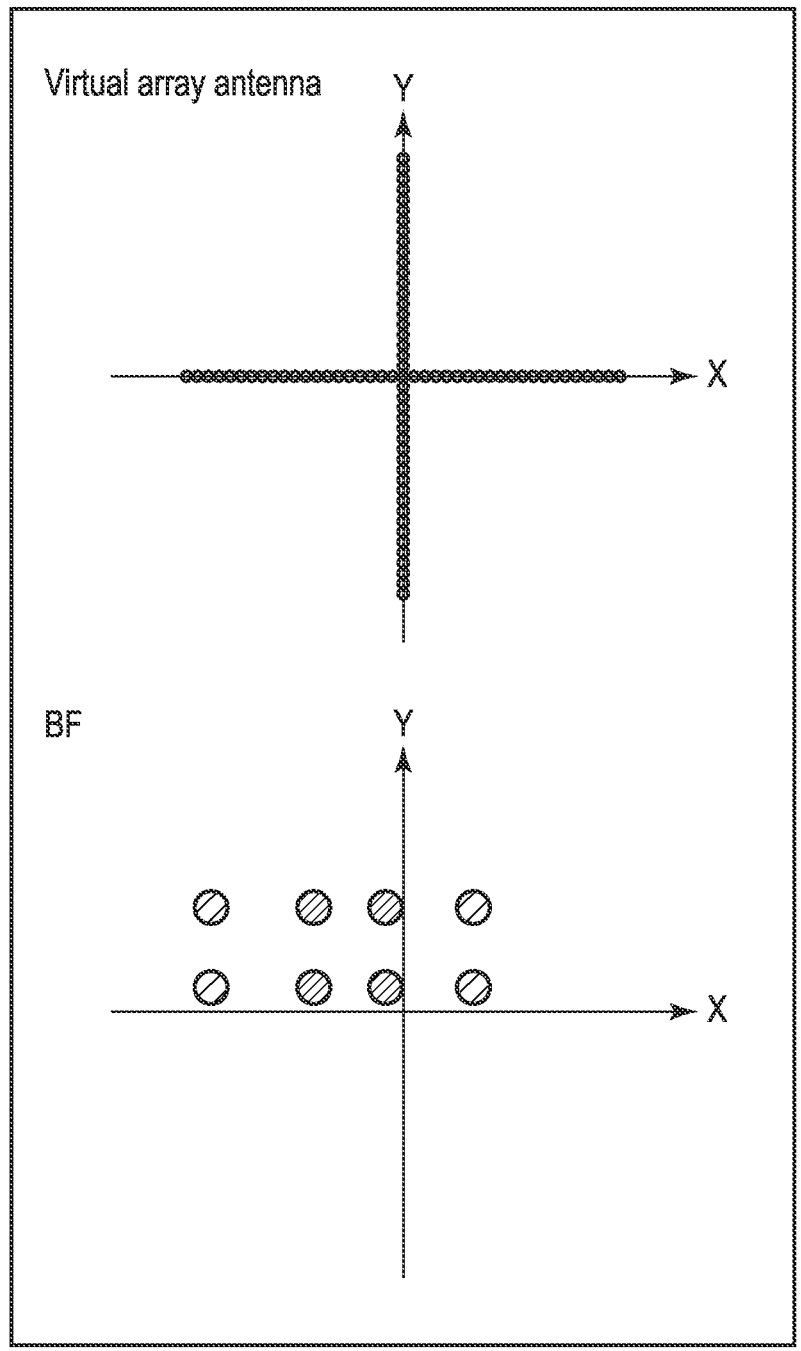
FIG. 20 illustrates a beamforming result based on a cross-shaped virtual array antenna according to the embodiment.

FIG. 20 illustrates the beamforming result BF based on a cross-shaped virtual array antenna. The density of hatching of circles depends on the BF value. In other words, the BF value is high in the region with high density of hatching and low in the region with low density of hatching. In the BF result based on the cross-shaped virtual array antenna, two false targets of the BF value which is substantially the same level as the two targets occur due to the influence from side lobes.

FIG. 21 illustrates the beamforming result BF based on a planar virtual array antenna. A number of false targets with a small BF value occur other than the two targets, due to the influence from side lobes.

Figure 22:
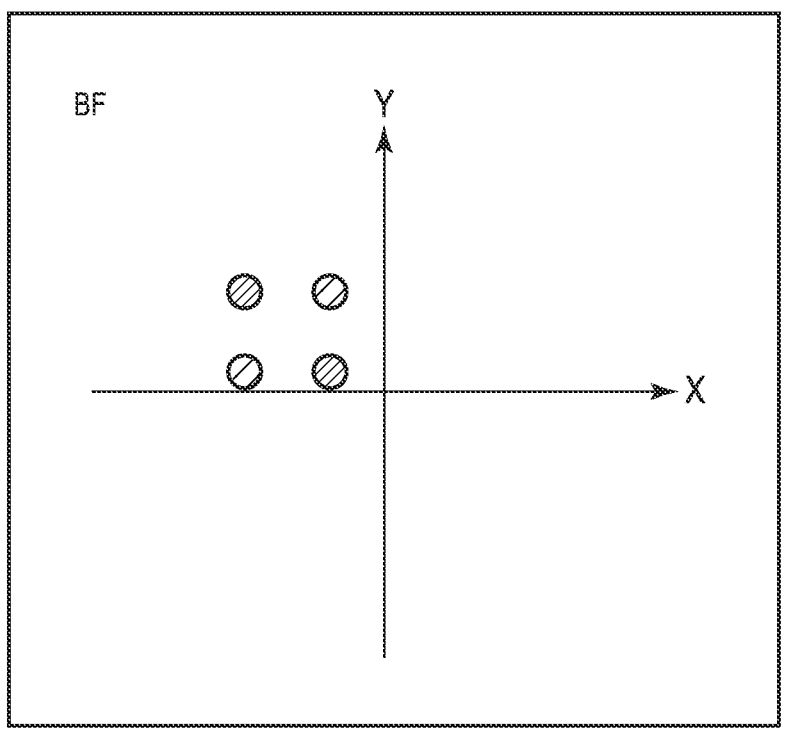
FIG. 22 illustrates a beamforming result according to the embodiment.

FIG. 22 illustrates the beamforming result BF obtained by combining the BF of FIG. 20 and the BF of FIG. 21. In the synthesized BF, values of the two false targets that exist in FIG. 20 become smaller and two targets with higher values occur at positions of dangerous objects 610a and 610b illustrated in FIG. 19.

According to the radar device 100 of the embodiments, the radar units 10a to 10d can easily be designed by arranging the four radar units 10a to 10d in a windmill-like configuration, in the radar panel 210a. Planar and cross-shaped virtual array antennas can be formed, and a sharp beam can be formed and the angular resolution can be improved by combining the beamforming results by both virtual array antennas. Furthermore, the number of virtual antennas forming the virtual array antenna can be increased efficiently and the aperture length of the radar panel can be expanded by using the transmit array antenna of MRA or the receive array antenna of MRA.

Figure 23:
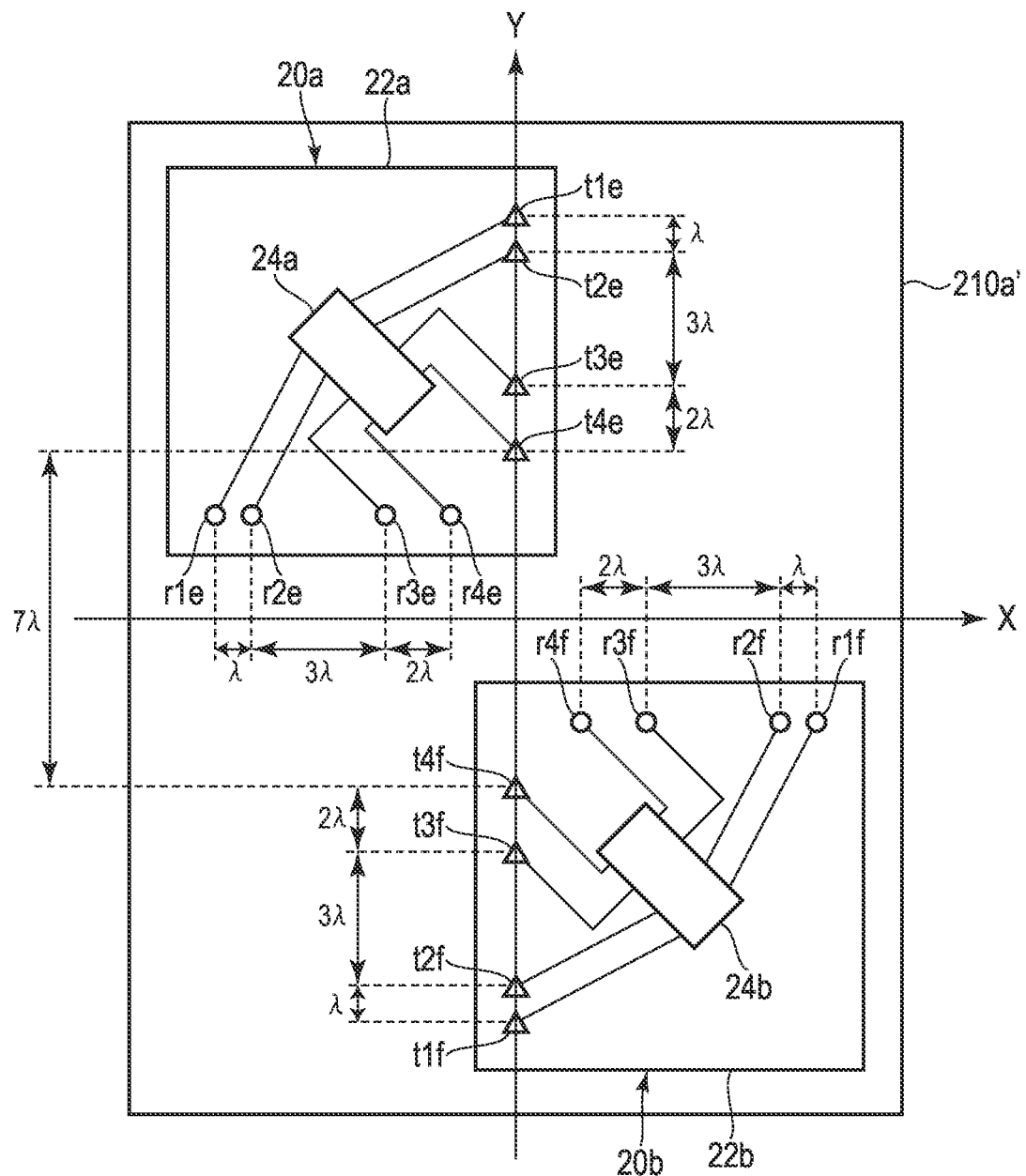
FIG. 23 is a diagram illustrating another example of a radar panel according to the embodiment.

FIG. 23 is a diagram illustrating a configuration of a modified example of the radar panel 210a illustrated in FIG. 2. The radar panel 210a' illustrated in FIG. 23 includes radar units 20a and 20b.

The radar unit 20a includes a substrate 22a, transmit array antenna, receive array antenna, and integrated circuit 24a. The transmit array antenna is arranged on a first side of the substrate 22a. The receive array antenna is arranged on a second side of the substrate 22a orthogonal to the first side. The integrated circuit 24a is arranged in a central part of the substrate 22a.

The transmit array antenna includes a plurality of transmit antennas t1e, t2e, t3e, and t4e. The transmit antennas t1e to t4e are arranged on a straight line along the Y direction of the X-Y-coordinate system having the center of the radar panel 10a' as the origin. For convenience of description, it is assumed that the transmit antennas t1e to t4e are arranged on the Y-axis. A Y-coordinate of each of the transmit antenna t1e to t4e is a positive value. An absolute value of the Y-coordinate of the transmit antenna t1e is the largest, and an absolute value of the Y-coordinate of the transmit antenna t4e is the smallest.

The transmit antennas t1e to t4e may be arranged at non-uniform intervals as illustrated in FIG. 23 or arranged at a uniform interval. In the example of FIG. 23, the interval between the transmit antennas t1e and t2e is λ. The interval between the transmit antennas t2e and t3e is 3λ. The interval between the transmit antennas t3e and t4e is 2λ.

The receive array antenna includes a plurality of receive antennas r1e, r2e, r3e, and r4e. The receive antennas r1e to r4e are arranged in a straight line along the X direction. The substrate 22a is arranged such that a most part thereof is located in the second quadrant of the X-Y-coordinate system of the radar panel 210a'. The X-coordinate of each of the receive antenna r1e to r4e is a negative value. The absolute value of the X-coordinate of the receive antenna r1e is the largest, and the absolute value of the X-coordinate of the receive antenna r4e is the smallest.

The receive antennas r1e to r4e may be arranged at non-uniform intervals as illustrated in FIG. 23 or may be arranged at a uniform interval. In the example of FIG. 23, the interval between the receive antennas r1e and r2e is λ. The interval between the receive antennas r2e and r3e is 3λ. The interval between the receive antennas r3e and r4e is 2λ.

The radar unit 20b includes a substrate 22b, transmit array antenna, receive array antenna, and integrated circuit 24b. The transmit array antenna is arranged on the first side of the substrate 22b. The receive array antenna is arranged on a second side of the substrate 22b orthogonal to the first side. The integrated circuit 24b is arranged in a central portion of the substrate 22b.

The transmit array antenna includes a plurality of transmit antennas t1f, t2f, t3f, and t4f. The transmit antennas t1f to t4f are arranged in a straight line along the Y direction. For convenience of description, it is assumed that the transmit antennas t1f to t4f are arranged on the Y-axis. The Y-coordinate of each of the transmit antennas t1f to t4f is a negative value. An absolute value of the Y-coordinate of the transmit antenna t1ƒ is the largest, and an absolute value of the Y-coordinate of the transmit antenna t4ƒ is the smallest.

The transmit antennas t1ƒ to t4ƒ may be arranged at non-uniform intervals as illustrated in FIG. 23 or arranged at a uniform interval. In the example of FIG. 23, the interval between the transmit antennas t1ƒ and t2ƒ is λ. The interval between the transmit antennas t2ƒ and t3ƒ is 3λ. The interval between the transmit antennas t3ƒ and t4ƒ is 2λ.

The receive array antenna includes a plurality of receive antennas r1ƒ, r2ƒ, r3ƒ, and r4ƒ. The receive antennas r1ƒ to r4ƒ are arranged in a straight line along the X direction. The substrate 22b is arranged such that its most part is located in the fourth quadrant of the X-Y-coordinate system. The X-coordinate of each of the receive antennas r1ƒ to r4ƒ is a positive value. The absolute value of the X-coordinate of the receive antenna r1ƒ is the largest, and the absolute value of the X-coordinate of the receive antenna r4ƒ is the smallest.

The receive antennas r1ƒ to r4ƒ may be arranged at non-uniform intervals as illustrated in FIG. 23 or may be arranged at a uniform interval. In the example of FIG. 23, the interval between the receive antennas r1ƒ and r2ƒ is λ. The interval between the receive antennas r2ƒ and r3ƒ is 3λ. The interval between the receive antennas r3ƒ and r4ƒ is 2λ.

When the radar unit 20a is rotated clockwise by 180 degrees around the origin of the X-Y-coordinate system of the radar panel 210a', the radar unit 20a corresponds to the radar unit 20b. In other words, a relative position of the transmit array antenna in the substrate 22a of the radar unit 20a corresponds to the relative position of the transmit array antenna in the substrate 22b of the radar unit 20b. Similarly, a relative position of the receive array antenna in the substrate 22a of the radar unit 20a corresponds to the relative position of the receive array antenna in the substrate 22b of the radar unit 20b. The coordinates that are references to the relative positions may be the centers of the integrated circuits 24a and 24b. For this reason, design of the antenna arrangement, wiring pattern, and the like of the radar unit 20b can be easily performed by only copying the design of the radar unit 20a (rotational movement and/or parallel shift).

In FIG. 2, the radar panels 10a to 10d in which the transmit antennas and the receive antennas form minimum redundancy arrays have been described. The transmitter/receiver 200 in which a plurality of radar panels are provided in a minimum redundancy arrangement will be described below.

Figure 25:
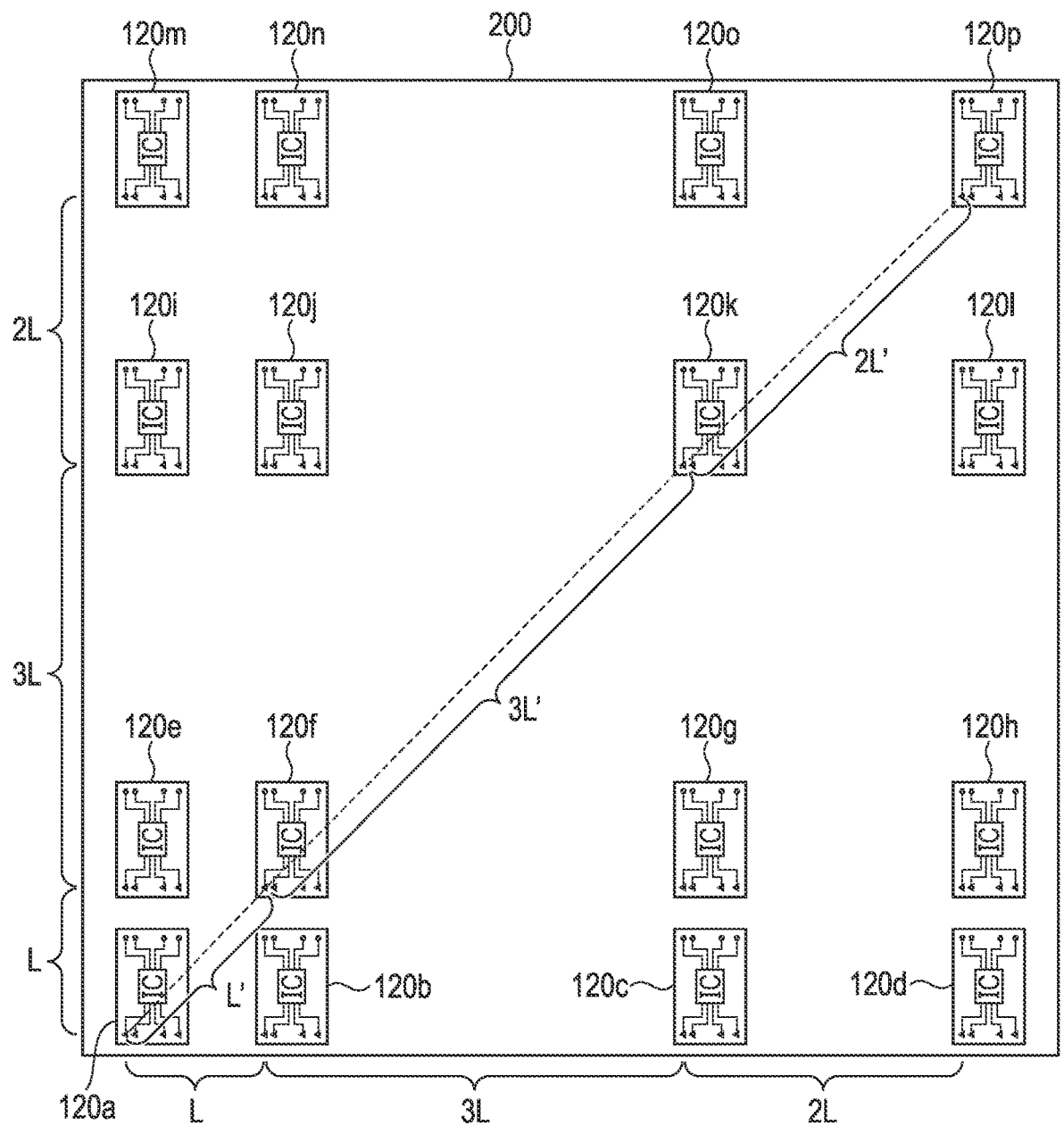
FIG. 25 is a diagram illustrating still another example of a radar panel according to the embodiment.

FIG. 24 is a diagram illustrating an example of a configuration of radar panels in the transmitter/receiver 200. FIG. 24 is an example of a configuration in which the radar panels are arranged in a straight line, and FIG. 25 is an example of a configuration in which the radar panels are arranged in two dimensions. In FIG. 24, radar panels 110a to 110d are the same in shape. In FIG. 25, radar panels 120a to 120p are the same in shape. The radar panels 110a to 110d and 120a to 120p are the same in shape, and the shape corresponds to the radar panel 10a in FIG. 2. In addition, the relative positions of the transmit array antennas of the radar units 110a to 110d and 120a to 120d in the substrates are the same. The relative positions of the receive array antennas of the radar units 110a to 110d and 120a to 120d in the substrates are the same.

The relative positions of the transmit array antennas of the radar units 110a to 110d and 120a-120p in the substrate may have a relationship in line symmetry. In addition, the relative positions of the receive array antennas of the radar units 110a to 110d and 120a-120p in the substrate may have a relationship in line symmetry.

As illustrated in FIG. 24, when the radar panels 110a to 110d are arranged in a straight line, an interval 3L between the radar panels 110b and 110c is three times as large as an interval L between the radar panels 110a and 110b. An interval 2L between the radar panels 110c and 110d is twice as large as the interval L between the radar panels 110a and 110b. A reference interval L of the radar panels can be set to any length. The reference interval L of the radar panels may be, for example, λ/2.

As illustrated in FIG. 25, when the radar panels are arranged in two dimensions, an interval between the radar panels arranged in the first direction (for example, the X direction) is as follows. An interval 3L between the radar panels 120b and 120c is three times as large as an interval L between the radar panels 120a and 120b. An interval 2L between the radar panels 120c and 120d is twice as large as the interval L between the radar panels 120a and 120b. An interval between the radar panels arranged in the second direction (for example, the Y direction) orthogonal to the first direction is as follows. An interval 3L between the radar panels 120e and 120i is three times as large as an interval L between the radar panels 120a and 120e. An interval 2L between the radar panels 120i and 120m is twice as large as the interval L between the radar panels 120a and 120e. Furthermore, an interval between the radar panels arranged in a third direction forming 45 degrees with the first direction and the second direction is as follows. An interval 3L' between the radar panels 120ƒ and 120k is three times as large as an interval L' between the radar panels 120a and 120ƒ. An interval 2L' between the radar panels 120k and 120p is twice as large as the interval L' between the radar panels 120a and 120ƒ.

The virtual array antenna including the antennas efficiently arranged at a uniform interval can be formed by minimizing the combination of the radar panels at a uniform interval and minimizing the redundancy of the radar panel interval. Accordingly, the aperture length of the radar device relative to the number of radar units can be increased and the imaging accuracy can be improved.

In each of the radar panels 110a to 110d and 120a to 120p, the transmit antennas may be provided at a uniform interval, the receive antennas may be provided at a uniform interval, the transmit antennas may form a minimum redundancy array, and the receive antennas may form a minimum redundancy array. When each of the transmit antennas and the receive antennas forms a minimum redundancy array, the virtual array antenna can be formed further efficiently. When each of the transmit antennas and the receive antennas forms a minimum redundancy array, the reference interval of the radar panel L=D+d can be set where the reference antenna interval of the transmit antennas and the receive antennas is d and the aperture length of the virtual array antenna to be formed is D. The reference antenna interval d represents a common factor of the intervals between the transmit antennas or a common factor of the intervals between the receive antennas. For example, the reference interval Lh=Dh+dh of the radar panel in the horizontal direction can be set where the reference antenna interval of the transmit antennas and receive antennas in the horizontal direction is dh and the horizontal aperture length of the virtual array antenna to be formed is Dh. Similarly, for example, the reference interval Lv=Dv+dv of the radar panel in the vertical direction can be set where the reference antenna interval of the transmit antennas and receive antennas in the vertical direction is dv and the vertical aperture length of the virtual array antenna to be formed is Dv.

When a plurality of radar panels are provided in a minimum redundancy arrangement, the controller 500 may form a virtual array antenna from parts of the plurality of radar panels. Alternatively, the controller 500 may divide the plurality of radar panels into two or more groups and form a virtual array antenna from each of the groups. Dangerous objects often can be detected efficiently by the controller 500.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A radar device comprising:
   a first radar unit; and
   a second radar unit,
   wherein
   the first radar unit comprises:
      a first substrate;
      a first transmit array antenna on the first substrate;
      a first receive array antenna on the first substrate; and
      a first integrated circuit on the first substrate, configured to control transmission and reception of the first transmit array antenna and the first receive array antenna,
   the second radar unit comprises:
      a second substrate;
      a second transmit array antenna on the second substrate;
      a second receive array antenna on the second substrate; and
      a second integrated circuit on the second substrate, configured to control transmission and reception of the second transmit array antenna and the second receive array antenna,
   a shape of the first substrate corresponds to a shape of the second substrate,
   a relative position of the first transmit array antenna in the first substrate corresponds to a relative position of the second transmit array antenna in the second substrate, or a relative position of an array antenna in the first substrate, the array antenna being in line symmetry with the first transmit array antenna with respect to a straight line which passes through a center of the first substrate and which is parallel to a side of the first substrate, corresponds to a relative position of the second transmit array antenna in the second substrate,
   a relative position of the first receive array antenna in the first substrate corresponds to a relative position of the second receive array antenna in the second substrate, or a relative position of an array antenna in the first substrate, the array antenna being in line symmetry with the first receive array antenna with respect to a straight line which passes through a center of the first substrate and which is parallel to a side of the first substrate, corresponds to a relative position of the second receive array antenna in the second substrate,
   the first receive array antenna and the second receive array antenna are configured to receive a reflected wave of an electromagnetic wave transmitted from the first transmit array antenna, and
   the first receive array antenna and the second receive array antenna are configured to receive a reflected wave of an electromagnetic wave transmitted from the second transmit array antenna.

2. The radar device of claim 1, wherein:
   the first transmit array antenna comprises at least three antennas arranged at a uniform interval; and
   the second transmit array antenna comprises at least three antennas arranged at a uniform interval.

3. The radar device of claim 1, wherein:
   the first transmit array antenna comprises a minimum redundancy array antenna; and
   the second transmit array antenna comprises a minimum redundancy array antenna.

4. The radar device of claim 3, wherein:
   a distance between closest antennas of the first transmit array antenna and the second transmit array antenna is longer than a sum of antenna intervals of the first transmit array antenna and a sum of antenna intervals of the second transmit array antenna.

5. The radar device of claim 1, wherein:
   the first receive array antenna comprises at least three antennas arranged at a uniform interval; and
   the second receive array antenna comprises at least three antennas arranged at a uniform interval.

6. The radar device of claim 1, wherein:
   the first receive array antenna comprises a minimum redundancy array antenna; and
   the second receive array antenna comprises a minimum redundancy array antenna.

7. The radar device of claim 6, wherein:
   a distance between closest antennas of the first receive array antenna and the second receive array antenna is longer than a sum of antenna intervals of the first receive array antenna and a sum of antenna intervals of the second receive array antenna.

8. The radar device of claim 1, further comprising:
   a first wiring pattern configured to connect the first integrated circuit to the first transmit array antenna; and
   a second wiring pattern configured to connect the second integrated circuit to the second transmit array antenna, wherein
   a shape of the first wiring pattern corresponds to a shape of the second wiring pattern.

9. The radar device of claim 1, further comprising:
   a first wiring pattern configured to connect the first integrated circuit to the first receive array antenna; and
   a second wiring pattern configured to connect the second integrated circuit to the second receive array antenna, wherein
   a shape of the first wiring pattern corresponds to a shape of the second wiring pattern.

10. A method for a radar device comprising a first radar unit and a second radar unit,
    wherein
    the first radar unit comprises:
       a first substrate;
       a first transmit array antenna on the first substrate;
       a first receive array antenna on the first substrate; and
       a first integrated circuit on the first substrate, configured to control transmission and reception of the first transmit array antenna and the first receive array antenna,
    the second radar unit comprises:
       a second substrate;

a second transmit array antenna on the second substrate;
a second receive array antenna on the second substrate; and
a second integrated circuit on the second substrate, configured to control transmission and reception of the second transmit array antenna and the second receive array antenna,
a shape of the first substrate corresponds to a shape of the second substrate,
a relative position of the first transmit array antenna in the first substrate corresponds to a relative position of the second transmit array antenna in the second substrate, or a relative position of an array antenna in the first substrate, the array antenna being in line symmetry with the first transmit array antenna with respect to a straight line which passes through a center of the first substrate and which is parallel to a side of the first substrate, corresponds to a relative position of the second transmit array antenna in the second substrate, and
a relative position of the first receive array antenna in the first substrate corresponds to a relative position of the second receive array antenna in the second substrate, or a relative position of an array antenna in the first substrate, the array antenna being in line symmetry with the first receive array antenna with respect to a straight line which passes through a center of the first substrate and which is parallel to a side of the first substrate, corresponds to a relative position of the second receive array antenna in the second substrate,
the method comprising:
receiving, by the first receive array antenna and the second receive array antenna, a reflected wave of an electromagnetic wave transmitted from the first transmit array antenna; and
receiving, by the first receive array antenna and the second receive array antenna, a reflected wave of an electromagnetic wave transmitted from the second transmit array antenna.

11. A radar system comprising:
a first radar unit;
a second radar unit; and
a processor connected to the first radar unit and the second radar unit, wherein
the first radar unit comprises:
a first substrate;
a first transmit array antenna on the first substrate;
a first receive array antenna on the first substrate; and
a first integrated circuit on the first substrate, configured to control transmission and reception of the first transmit array antenna and the first receive array antenna,
the second radar unit comprises:
a second substrate;
a second transmit array antenna on the second substrate;
a second receive array antenna on the second substrate; and
a second integrated circuit on the second substrate, configured to control transmission and reception of the second transmit array antenna and the second receive array antenna,
a shape of the first substrate corresponds to a shape of the second substrate,
a relative position of the first transmit array antenna in the first substrate corresponds to a relative position of the second transmit array antenna in the second substrate, or a relative position of an array antenna in the first substrate, the array antenna being in line symmetry with the first transmit array antenna with respect to a straight line which passes through a center of the first substrate and which is parallel to a side of the first substrate, corresponds to a relative position of the second transmit array antenna in the second substrate,
a relative position of the first receive array antenna in the first substrate corresponds to a relative position of the second receive array antenna in the second substrate, or a relative position of an array antenna in the first substrate, the array antenna being in line symmetry with the first receive array antenna with respect to a straight line which passes through a center of the first substrate and which is parallel to a side of the first substrate, corresponds to a relative position of the second receive array antenna in the second substrate,
the first receive array antenna and the second receive array antenna are configured to receive an electromagnetic wave transmitted from the first transmit array antenna and reflected by an object,
the first receive array antenna and the second receive array antenna are configured to receive an electromagnetic wave transmitted from the second transmit array antenna and reflected by the object, and
the processor is configured to calculate information on the object based on a received signal of the first receive array antenna and a received signal of the second receive array antenna.

* * * * *